United States Patent
Breyer et al.

(10) Patent No.: US 10,526,489 B2
(45) Date of Patent: *Jan. 7, 2020

(54) METHODS FOR REDUCING THE SOLUBILITY OF PHENOLIC RESINS USING LATENT ACIDS

(71) Applicant: Georgia-Pacific Chemicals LLC, Atlanta, GA (US)

(72) Inventors: Robert A. Breyer, Atlanta, GA (US); Melissa J. Cannon, Ellenwood, GA (US); Jessica D. Jennings, Social Circle, GA (US); Daniel C. Yeager, Smyrna, GA (US); Lawrence Gollob, Stone Mountain, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 181 days.

This patent is subject to a terminal disclaimer.

(21) Appl. No.: 15/640,741

(22) Filed: Jul. 3, 2017

(65) Prior Publication Data

US 2017/0298228 A1      Oct. 19, 2017

Related U.S. Application Data

(63) Continuation of application No. 14/204,389, filed on Mar. 11, 2014, now Pat. No. 9,695,319.

(60) Provisional application No. 61/782,712, filed on Mar. 14, 2013.

(51) Int. Cl.
  *C08J 5/24* (2006.01)
  *C08K 5/17* (2006.01)
  *C08L 61/06* (2006.01)
  *C08L 97/02* (2006.01)

(52) U.S. Cl.
  CPC .............. *C08L 97/02* (2013.01); *C08J 5/24* (2013.01); *C08K 5/17* (2013.01); *C08L 61/06* (2013.01); *C08J 2361/06* (2013.01)

(58) Field of Classification Search
  None
  See application file for complete search history.

(56) References Cited

U.S. PATENT DOCUMENTS

| | | |
|---|---|---|
| 3,342,893 A | 9/1967 | Emmons et al. |
| 3,748,578 A | 7/1973 | Ward |
| 3,936,542 A | 2/1976 | Cox |
| 4,612,802 A | 9/1986 | Clarke et al. |
| 4,683,418 A | 7/1987 | Wagner et al. |
| 4,961,795 A | 10/1990 | Detlefsen et al. |
| 6,974,035 B2 | 12/2005 | Dai et al. |
| 7,068,050 B2 | 6/2006 | Steele et al. |
| 2003/0096922 A1 | 5/2003 | Tutin et al. |
| 2012/0041168 A1 | 2/2012 | Murray |

FOREIGN PATENT DOCUMENTS

| | | |
|---|---|---|
| WO | 02/30642 | 4/2002 |
| WO | 2004/029119 | 4/2004 |
| WO | 2010/094979 | 8/2010 |

*Primary Examiner* — Bradley R Spies
(74) *Attorney, Agent, or Firm* — Edmonds & Cmaidalka, P.C.; Jared E. Cmaidalka; Ram W. Sabnis

(57) ABSTRACT

Resin compositions having a reduced solubility and methods for making and using same are provided. In at least one specific embodiment, the resin composition can include a phenolic resin, a latent acid, a catalyst, and a liquid medium. The catalyst can be a base compound and can be present in an amount of about 2 wt % to about 7 wt %, based on the combined weight of the phenolic resin, the latent acid, the catalyst, and the liquid medium.

20 Claims, No Drawings

METHODS FOR REDUCING THE SOLUBILITY OF PHENOLIC RESINS USING LATENT ACIDS

CROSS-REFERENCE TO RELATED APPLICATIONS

This application is a continuation of co-pending U.S. patent application Ser. No. 14/204,389, filed on Mar. 11, 2014, which claims priority to U.S. Provisional Patent Application No. 61/782,712, filed on Mar. 14, 2013, which are both incorporated by reference herein.

BACKGROUND

Field

Embodiments described generally relate to methods for reducing the solubility of phenolic resins using latent acids. More particularly, such embodiments relate to reducing the solubility of phenolic resins for use in the manufacture of lignocellulosic composite products.

Description of the Related Art

Phenolic-based resins play an important role in the manufacture of wood composite products, such as oriented strand board and plywood. The development of mechanical and other properties of the wood composite products relies significantly on the phenolic-based resin composition. For example, the penetration of the phenolic-based resin into the porous network of wood cells has a strong influence on the internal bond strength. Damaged wood cells can be reinforced by the resin, and stresses can be more effectively distributed within a larger interphase region.

For good resin bonding, a moderate amount of resin penetration is desirable; however, some resin compositions may penetrate the wood and diffuse into the fibers too readily. Over-penetration of the resin can waste the resin and can lead to a starved glue line with insufficient resin remaining at the interface to allow for good bonding efficiency.

There is a need, therefore, for improved resin compositions having a reduced solubility for use in the manufacture of lignocellulosic composite products.

SUMMARY

Resin compositions having a reduced solubility and methods for making and using same are provided. In at least one specific embodiment, the resin composition can include a phenolic resin, a latent acid, a catalyst, and a liquid medium. The catalyst can include a base compound and can be present in an amount of about 2 wt % to about 7 wt %, based on the combined weight of the phenolic resin, the latent acid, the catalyst, and the liquid medium.

In at least one specific embodiment, the method for making a composite product can include mixing a plurality of lignocellulose substrates and a resin composition to produce a resinated furnish. The resin composition can include the phenolic resin, the latent acid, the catalyst, and the liquid medium. The catalyst can include the base compound and can be present in an amount of about 2 wt % to about 7 wt %, based on the combined weight of the phenolic resin, the latent acid, the catalyst, and the liquid medium. The method can also include heating the resinated furnish to produce a composite product.

In at least one specific embodiment, the composite product can include an at least partially cured resinated furnish. Prior to curing, the resinated furnish can include a plurality of lignocellulose substrates and a resin composition. The resin composition can include the phenolic resin, the latent acid, the catalyst, and the liquid medium. The catalyst can include the base compound and can be present in an amount of about 2 wt % to about 7 wt %, based on the combined weight of the phenolic resin, the latent acid, the catalyst, and the liquid medium.

DETAILED DESCRIPTION

The resin composition can include, but is not limited to, one or more phenolic resins, one or more latent acids, one or more catalysts, and one or more liquid media. The catalyst can be or include one or more base compounds and can also be referred to as a "cure accelerator," "basic compound," "alkali compound," or a "resin composition catalyst." The catalyst can be present in an amount sufficient to provide the resin composition with a pH of greater than 7. It has been surprisingly and unexpectedly discovered that mixing, blending, contacting, or otherwise combining the latent acid with the phenolic resin at a pH of greater than 7 can reduce the solubility of the phenolic resin. Reducing the solubility of the phenolic resin can reduce the degree or amount the phenolic resin penetrates into the lignocellulose substrates. It has also been discovered that less advanced phenolic resins, which can be prone to over-penetration, can be used as the phenolic resin in preparation of the resin composition. The less advanced phenolic resins can have faster cure rates than more advanced resins. The latent acid can further increase the cure rate of the resin by facilitating the removal of water or liquid medium from the resin composition during cure. And, since the latent acid is not significantly released until it is heated or irradiated, the resinated furnish can have an increased resistance to premature dry-out.

Not wishing to be bound by theory, it is believed that protonating one or more basic sites on the phenolic resin and/or changing the ionic strength of the phenolic resin solution can reduce the solubility of the phenolic resin allowing for it to more effectively precipitate onto the surface of a lignocellulose substrate. In the absence of the latent acid, the phenolic resin would retain greater solubility, which would allow for the water or liquid medium to carry the resin deeper into the wood and promote, cause, or otherwise allow over-penetration of the resin into the lignocellulose substrate. Said another way, under the same conditions, e.g., amount of resin composition applied to a lignocellulose substrate, temperature, and pressure, a phenolic resin composition containing a latent acid penetrates into the lignocellulose substrate less in a given period of time than a phenolic resin composition that does not contain a latent acid.

The resin composition can have a pH from a low of about 6.8, about 6.9, about 7, about 7.3, about 7.5, about 7.8, about 8, or about 8.2, to a high of about 11.5, about 12, about 12.5, about 13, or about 13.5. For example, the resin composition can have a pH of about 7.8 to about 8.5, about 8 to about 10, about 8.5 to about 9.5, about 9 to about 11, about 9.5 to about 10.5, about 10 to about 12, about 10.5 to about 11.5, about 11 to about 12.5, about 11.5 to about 12.5, or about 12 to about 13. In another example, the resin composition can have a pH of about 6.9 to about 7.2, about 7.1 to about 10.5, about 7.2 to about 12, about 7.3 to about 10.3, about 7.7 to about 8.2, about 7.6 to about 8.6, or about 8.3 to about 9.2. In one or more embodiments, the resin composition can have a pH of at least 7, at least 7.1, at least 7.2, at least 7.3, at least 7.4, at least 7.5, at least 7.6, at least 7.7, at least 7.8, at least 7.9, at least 8, at least 8.1, at least 8.2, at least 8.3, at least 8.4, at least 8.5, at least 8.6, at least 8.7, at least 8.8, at least 9, at least 9.3, at least 9.5, at least 9.7, or at least 10 and up to about 10.5, about 11, about 11.5, about 12, about 13, or about 13.5. In one or more embodiments, the resin composition can have a pH of less than 13.3, less than 12.9, less than 11.5, or less than 9.7.

The phenolic resin can be present in the resin composition in an amount of at least 15 wt %, at least 20 wt %, at least 25 wt %, at least 30 wt %, at least 35 wt %, at least 45 wt %, or at least 50 wt %, based on the combined weight of the phenolic resin, the latent acid, the catalyst, and the liquid medium. The phenolic resin can be present in the resin composition in an amount of less than 63 wt %, less than 47 wt %, less than 38 wt %, less than 29 wt %, or less than 25 wt %, based on the combined weight of the phenolic resin, the latent acid, the catalyst, and the liquid medium. For example, the phenolic resin can be present in the resin composition in an amount from a low of about 20 wt %, about 25 wt %, about 30 wt %, about 35 wt %, about 37 wt %, about 40%, or about 45 wt %, to a high of about 50%, about 55%, about 60%, or about 65 wt %, based on the combined weight of the phenolic resin, the latent acid, the catalyst, and the liquid medium. In another example, the phenolic resin can be present in the resin composition in an amount of about 20 wt % to about 70 wt %, such as, for example, about 22 wt % to about 30 wt %, about 28 wt % to about 40 wt %, about 39 wt % to about 48 wt %, about 46 wt % to about 52 wt %, about 45 wt % to about 55 wt %, about 50 wt % to about 57 wt %, or about 55 wt % to about 68 wt %, based on the combined weight of the phenolic resin, the latent acid, the catalyst, and the liquid medium.

The latent acid can be present in the resin composition in an amount of at least 0.01 wt %, at least 0.1 wt %, at least 0.5 wt %, at least 1 wt %, at least 3 wt %, at least 5 wt %, at least 7 wt %, at least 10 wt %, at least 13% wt, at least 15 wt %, at least 17 wt %, at least 20 wt %, or at least 22 wt %, based on the combined weight of the phenolic resin, the latent acid, the catalyst, and the liquid medium. The latent acid can be present in the resin composition in an amount less than 30 wt %, less than 27 wt %, less than 25 wt %, less than 23 wt %, less than 20 wt %, less than 17 wt %, less than 15 wt %, less than 13 wt %, less than 2 wt %, or less than 0.1 wt %, based on the combined weight of the phenolic resin, the latent acid, the catalyst, and the liquid medium. For example, the latent acid can be present in the resin composition in an amount from a low of about 0.03 wt %, about 0.1 wt %, about 1 wt %, about 2 wt %, about 3 wt %, about 10%, or about 11 wt %, to a high of about 15 wt %, about 17 wt %, about 21 wt %, about 22 wt %, or about 28 wt %, based on the combined weight of the phenolic resin, the latent acid, the catalyst, and the liquid medium. In another example, the latent acid can be present in the resin composition in an amount of about 0.3 wt % to about 10 wt %, about 0.05 wt % to about 1 wt %, about 0.07 wt % to about 2 wt %, about 1.4 wt % to about 3 wt %, about 2.8 wt % to about 5 wt %, about 4 wt % to about 9 wt %, about 8 wt % to about 12 wt %, or about 15 wt % to about 25 wt %, based on the combined weight of the phenolic resin, the latent acid, the catalyst, and the liquid medium.

The amount of resin composition catalyst or simply "catalyst" can be at least 0.1 wt %, at least 0.5 wt %, at least 0.7 wt %, at least 1 wt %, at least 1.5 wt %, at least 1.7 wt %, at least 2 wt %, at least 2.3 wt %, at least 2.5 wt %, at least 2.7 wt %, at least 3 wt %, at least 3.3 wt %, at least 3.5 wt %, at least 3.7 wt %, or at least 4 wt %, based on the combined weight of the phenolic resin, the latent acid, catalyst, and the liquid medium. The amount of catalyst can be less than 12 wt %, less than 10 wt %, or less than 5 wt %, based on the combined weight of the phenolic resin, the latent acid, the catalyst, and the liquid medium. For example, the amount of catalyst can be from a low of about 0.1 wt %, about 1 wt %, or about 2 wt %, to a high of about 8 wt %, about 10 wt %, or about 12 wt %, based on the combined weight of the phenolic resin, the latent acid, the catalyst, and the liquid medium. In another example, the amount of catalyst can be about 2 wt % to about 7 wt %, about 0.2 wt % to about 1.5 wt %, about 1.2 wt % to about 3.5 wt %, about 2.2 wt % to about 6.5 wt %, about 3.2 wt % to about 6.5 wt %, about 3.5 wt % to about 7.5 wt %, about 4.5 wt % to about 8.5 wt %, about 2.5 wt % to about 9.5 wt %, based on the combined weight of the phenolic resin, the latent acid, the catalyst, and the liquid medium.

The liquid medium can be present in the resin composition in an amount of at least 35 wt %, at least 40% wt, at least 45 wt %, or at least 50 wt %, based on the combined weight of the phenolic resin, the latent acid, the catalyst, and the liquid medium. The liquid medium can be present in the resin composition in an amount less than 80 wt %, less than 70 wt %, less than 60 wt %, less than 50 wt %, or less than 40 wt %, based on the combined weight of the phenolic resin, the latent acid, the catalyst, and the liquid medium. For example, the liquid medium can be present in the resin composition in an amount from a low of about 35 wt %, about 39 wt %, about 42 wt %, or about 49 wt %, to a high of about 50%, about 55%, about 60%, about 70%, or about 75 wt %, based on the combined weight of the phenolic resin, the latent acid, the catalyst, and the liquid medium. In another example, the liquid medium can be present in the resin composition in an amount of about 32 wt % to about 40 wt %, about 40 wt % to about 70 wt %, about 42 wt % to about 48 wt %, about 46 wt % to about 52 wt %, about 45 wt % to about 55 wt %, about 50 wt % to about 57 wt %, or about 55 wt % to about 68 wt %, based on the combined weight of the phenolic resin, the latent acid, the catalyst, and the liquid medium.

The viscosity of the resin composition can vary widely. The resin composition can have a viscosity of at least 100 centipoise (cP), at least 200 cP, at least 500 cP, at least 700 cP, at least 900 cP, or at least 1,100 cP at a temperature of 25° C. The resin composition can have a viscosity of less than 10,000 cP, less than 5,000 cP, or less than 1,000 cP at a temperature of 25° C. For example, the viscosity of the resin composition can be from a low of about 100 cP, about 250 cP, about 500 cP, or about 700 cP to a high of about 1,000 cP, about 3,250 cP, about 5,000 cP, about 7,000 cP, or about 10,000 cP at a temperature of about 25° C. In another example, the resin composition can have a viscosity of about 100 cP to about 350 cP, about 300 cP to about 775 cP, about 750 cP to about 1,250 cP, about 1,100 cP to about 1,460 cP, about 1,400 cP to about 3,100 cP, about 3,000 cP to about 5,600 cP, about 5,000 cP to about 8,200 cP, or about 7,900 cP to about 9,990 cP at a temperature of about 25° C. In yet another example, the resin composition can have a viscosity of about 210 cP to about 450 cP, about 350 cP to about 1,205, about 550 cP to about 755 cP, about 650 cP to about 825 cP, about 1,250 cP to about 3,300 cP, about 3,100 cP to about 6,600 cP, or about 4,600 cP to about 7,200 cP at a temperature of about 25° C. The viscosity can be measured using a viscometer. For example, a Brookfield Viscometer can be equipped with a small sample adapter such a 10 mL adapter and the appropriate spindle to maximize torque such as a spindle no. 31. The viscosities discussed and described herein are determined at a temperature of 25° C. unless otherwise indicated.

The resin composition can have a non-volatile material or "solids" content of at Least 25 wt %, at least 30 wt %, at least 33 wt %, at least 35 wt %, at least 37 wt %, or at least 40 wt %, based on the combined weight of the phenolic resin, the latent acid, the catalyst, and the liquid medium. The resin composition can have a solids content of less than 75 wt %, less than 70 wt %, less than 65 wt %, less than 60 wt %, or less than 55 wt %, based on the combined weight of the phenolic resin, the latent acid, the catalyst, and the liquid medium. For example, the resin composition can have a solids content from a low of about 25 wt %, about 30 wt %, about 35 wt %, about 40 wt %, about 45 wt %, or about 50 wt %, to a high of about 60 wt %, about 63 wt %, about 65 wt %, about 68 wt %, about 71 wt %, or about 75 wt %, based on the combined weight of the phenolic resin, the latent acid, the catalyst, and the liquid medium. In other example, resin composition can have a solids content of about 25 wt % to about 35 wt %, about 30 wt % to about 45 wt %, about 40 wt % to about 60 wt %, about 55 wt % to about 65 wt %, about 50 wt % to about 75 wt %, about 60 wt % to about 70 wt %, or about 25 wt % to about 75 wt %, based on the combined weight of the phenolic resin, the latent acid, the catalyst, and the liquid medium.

As used herein, the solids content of a composition, as understood by those skilled in the art, can be measured by determining the weight loss upon heating a small sample, e.g., 1-5 grams of the composition, to a suitable temperature, e.g., 125° C., and a time sufficient to remove the liquid. By measuring the weight of the sample before and after heating, the percent solids in the composition can be directly calculated or otherwise estimated.

For some applications, it can be desirable to have control over the cure rate of the phenolic resin to allow for large scale production, shipping, and/or storage. The terms "pot life" and "gel time" usually refer to the time required for the adhesive composition to cure, which can be measured a number of ways, but near the end of the gel time the viscosity of the adhesive composition is too high for satisfactory application of the adhesive to a substrate. As the crosslinking reactions progress the viscosity of the adhesive composition increases.

The resin composition can have a gel time or pot life from a low of about 2 minutes, about 5 minutes, about 10 minutes, about 30 minutes, or about 1 hour to a high of about 2 hours, about 3 hours, about 5 hours, about 9 hours, about 12 hours, about 24 hours, about 36 hours, about 48 hours or about 72 hours. For example, the resin composition can have a gel time or pot life of about 10 minutes to about 240 minutes, about 20 minutes to about 180 minutes, about 30 minutes to about 4 hours, about 1 hour to about 9 hours, about 2 hours to about 24 hours, about 2 hours to about 12 hours, about 3 hours to about 36 hours, about 24 hours to about 48 hours, or about 48 hours to about 72 hours In another example, the resin composition can have a gel time or pot life less than 240 minutes or less than 210 minutes, or less than 24 hours, but at least 5 minutes, at least 10 minutes, at least 1 hour, at least 2 hours, or at least 6 hours. In at least one specific example, the resin composition can have a gel time or pot life of about 80 minutes to about 120 minutes in the winter time or about 1 to about 24 hours in the summer time. In at least one other specific example, the resin composition can have a gel time or pot life of about 2 minutes to about 1 hour, about 2 hours to about 12 hours, or about 12 hours to about 72 hours.

The gel time or pot life of the resin composition can be determined according to any suitable method. One suitable method for determining or estimating the gel time of the resin composition can be as follows. A sample of the resin composition, e.g., about 20 g to about 30 g can be added to an appropriate container, e.g., a beaker, a 2.5 cm×11.5 cm centrifuge tube, or the like, and the temperature can be adjusted to about 25° C. The container can be tapped to remove air bubbles from the adhesive composition. The container can be placed in a water bath (to maintain the temperature of the adhesive composition at about 25° C.) under a gel timer equipped with a plunger. The surface of the resin composition should be below the surface of the water. A ring or other appropriate device can be used to position and hold the container in the gel time measuring device. The end of the gel timer plunger can be immersed in the resin composition and centered within the tube. The gel timer can be turned on. The time at which the gel timer stops can be recorded. A suitable gel timer can include the Techne Gelation Timer, model no. F925P.

Another suitable method for determining or estimating the gel time of the resin composition can be as follows. The desired amount of resin composition can be added to a beaker and mixed. The timer can be started when mixing begins. The temperature of the adhesive composition can be adjusted to about 25° C. A spindle can be inserted into the beaker and centered therein and attached to the viscometer. The viscometer can be started and the viscosity can be recorded periodically, e.g., every 2 minutes, until the adhesive composition reaches a desired viscosity, e.g., 100,000 cP. When the resin composition reaches the desired viscosity the viscometer can be stopped and the spindle can be removed and cleaned. A suitable viscometer can include a Brookfield Viscometer, Model LVF, with a number 4 spindle or equivalent. The mixture can be placed under the viscometer; the viscometer can be started, and after about 2 minute the viscosity pointer can be locked and the viscosity periodically recorded until the desired viscosity is reached.

Any latent acid or mixture of latent acids can be used in the resin composition. The latent acid can include a base component. It should be noted, that if the latent acid includes a base component the base component of the latent acid is not considered to be a part of the resin composition catalyst that can be added to increase the pH of the resin composition and/or to accelerate cure of the phenolic resin in the resin composition. An acid component of a latent acid dissolved in water or an aqueous solution can be released by heating and/or irradiating the latent acid causing dissociation or decomposition of the base component of the latent acid. A suitable base component can include, but is not limited to, primary, secondary, or tertiary amines. Suitable latent acids can include, but are not limited to, one or more amine salts. Illustrative amine salts can be or include the reaction product of one or more amines with one or more acids. For example, the latent acid can be prepared by mixing or contacting a suitable acid with a suitable primary, secondary, and/or tertiary amine under amine salt-forming conditions.

The acid can be mixed with the amine in an amount sufficient to provide a stoichiometry of about one mole of acid moiety per one mole of amine moiety. In another example, the acid can be present in an amount that is greater than a 1:1 stoichiometric ratio, i.e., in a stoichiometric excess relative to the moles of amine moieties. In another example, the acid can be present in an amount that is less than a 1:1 stoichiometric ratio, i.e., in a stoichiometric deficient amount relative to the moles of amine moieties. In one or more embodiments, the molar ratio of amine to acid in the resin composition can be from a low of about 0.9:1, about 1.2:1 about 1.3:1, about 1.5:1, or about 1.9:1, to a high of about 2.5:1, about 3:1, about 3.5:1, about 5:1, or about 6:1. For example, the molar ratio of amine to acid can be about 1:1 to about 1.7:1, about 1.2:1 to about 1.5:1, about 1.8:1 to about 2.4:1, about 2.2:1 to about 3.6:1, or about 3:1 to about 3.8:1. In other example, the molar ratio of amine to acid of about 1.8:1 to about 2.9:1, about 2.9:1 to about 3.3:1, about 4:1 to about 5.2:1, about 4.2:1 to about 5.3:1, or about 5:1 to about 6:1. In one or more embodiments, the molar ratio of acid to amine in the resin composition can be from a low of about 0.9:1, about 1.2:1 about 1.3:1, about 1.5:1, or about 1.9:1, to a high of about 2.5:1, about 3:1, about 3.5:1, about 5:1, or about 6:1. For example, the molar ratio of acid to amine can be about 1:1 to about 1.7:1, about 1.2:1 to about 1.5:1, about 1.8:1 to about 2.4:1, about 2.2:1 to about 3.6:1, or about 3:1 to about 3.8:1. In other example, the molar ratio of acid to amine of about 1.8:1 to about 2.9:1, about 2.9:1 to about 3.3:1, about 4:1 to about 5.2:1, about 4.2:1 to about 5.3:1, or about 5:1 to about 6:1.

The amines for preparing the latent acid can be represented by the general formulas: $NH_2R^1$, $NHR^1R^2$, $NR^1R^2R^3$, which are referred to herein as primary, secondary, and tertiary amines, respectively. The $R^1$, $R^2$, and $R^3$ substituents of the primary, secondary, and tertiary amines can be the same or different and can independently be any substituent that does not interfere with the formation of the amine salt or the subsequent use of the salt as a latent acid. The $R^1$, $R^2$, and $R^3$ substituents can independently be hydrocarbon moieties such as alkyl groups, such as lower alkyl group (linear or branched) of 1 carbon atom to about 8 carbon atoms; alkenyl groups, such as a lower alkenyl group (linear or branched) of at least 3 carbon atoms to about 8 carbons; alkynyl groups, such as a lower alkynyl group (linear or branched) of at least 3 carbon atoms to about 6 carbon atoms; cycloalkyl and cycloalkenyl groups, generally of about 4 carbon atoms to about 8 carbon atoms; aryl groups, such as phenyl or naphthyl, aralkyl, and aralkenyl groups generally having about 7 carbon atoms to about 16 carbon atoms; and alkenaryl and alkaryl groups, also generally having about 7 carbon atoms to about 16 carbon atoms. In the case of secondary (e.g., $NHR^1R^2$) or tertiary (e.g., $NR^1R^2R^3$) amines, the $R^1$, $R^2$, and/or $R^3$ substituents can also be linked together to form a saturated or unsaturated 5 to 9 member (atom) cyclic or ring structure. In some examples, the ring can contain up to 3 nitrogen atoms and up to 6 carbon atoms. Examples of such ring structures can include, but are not limited to, morpholino, pyrrolidino, piperidino, and the like.

Examples of specific $R^1$, $R^2$, and $R^3$ substituents can include, but are not limited to, methyl, ethyl, n-propyl, isopropyl, n-butyl, isobutyl, t-butyl, pentyl, hexyl, octyl, phenyl, benzyl, isomers thereof, and the like. Specific examples of suitable amines include primary amines, secondary amines, and tertiary amines, aliphatic amines, alicyclic amines, aromatic amines, heterocyclic amines, and combinations thereof. Representative primary, secondary, and tertiary aliphatic amines can include the N-alkyl amines, such as methyl, ethyl, propyl and butyl amines; the N-alkylene diamines, such as ethylene diamine, propylene diamine, and butylene diamine; N,N-dialkylene triamines, such as diethylene triamine; the N,N-dialkyl amines, such as N,N-dimethyl amine and N,N-diethyl amine; N,N-dialkenyl amines, such as N,N-diethyleneamine; N-alkyl diamines, such as 1,3-diaminopropane and 1,2-diaminopropane; N-alkanolamines, such as ethanolamine; N-alicyclic amines, such as 1,2-diaminocyclohexane and N-cyclohexylamine; N-aryl amines and N,N-aryl amines, such as aniline, N-methylaniline, and N-benzyl amine; N,N,N-trialkyl amines, such as trimethylamine and triethylamine; and heterocyclic amines, such as melamine, pyrrole, pyrrolidine, and piperidine.

In some exemplary embodiments, the latent acid can be formed with and/or can include hydroxylamine. In some embodiments, the elevated temperature used in curing the resin of the resin composition can be about 117° C. or greater, which is approximately the decomposition temperature of hydroxylamine. In some examples, the latent acid can be released from the resin at temperatures of about 117° C. or greater.

In some embodiments, suitable acids that can be contained in or used to form the latent acid can include, but are not limited to, mineral acids, including, but not limited to, phosphorous-containing acids, sulfur-containing acids, and nitrogen-containing acids, conjugate bases thereof, alkaline salts thereof, rare earth salts thereof, other salts thereof, or any mixture thereof. Exemplary phosphorous-containing acids can include phosphoric acid ($H_3PO_4$); conjugate bases of phosphoric acid, such as dihydrogen phosphate ($[H_2PO_4]^-$), hydrogen phosphate ($[HPO_4]^{2-}$), and phosphate ($[PO_4]^{3-}$); phosphorous acid ($H_3PO_3$); conjugate bases of phosphorous acid, such as $[H_2PO_3]^-$, $[HPO_3]^{2-}$, and $[PO_3]^{3-}$; hypophosphorous acid ($H_3PO_2$); conjugate bases of hypophosphorous acid, such as $[H_2PO_2]^-$, $[HPO_2]^{2-}$, and $[PO_2]^{3-}$; pyrophosphoric acid ($H_4P_2O_7$); conjugate bases of pyrophosphoric acid, such as $[H_3P_2O_7]^-$, $[H_2P_2O_7]^{2-}$, $[HP_2O_7]^{3-}$, and $[P_2O_7]^{4-}$; alkaline salts thereof, rare earth salts thereof, other salts thereof, or any mixture thereof. Exemplary sulfur-containing acids can include sulfuric acid ($H_2SO_4$); conjugate bases of sulfuric acid, such as bisulfate ($[HSO_4]^-$) and sulfate ($[SO_4]^{2-}$); sulfurous acid ($H_2SO_3$); conjugate bases of sulfurous acid, such as bisulfite ($[HSO_3]^-$) and sulfite ($[SO_3]^{2-}$); disulfuric acid or pyrosulfuric acid ($H_2S_2O_7$); conjugate bases of pyrosulfuric acid, such as $[HS_2O_7]^-$ and $[S_2O_7]^{2-}$; disulfurous acid or pyrosulfurous acid ($H_2S_2O_5$); conjugate bases of pyrosulfurous acid, such as $[HS_2O_5]^-$ and $[S_2O_5]^{2-}$; hydrosulfuric acid ($H_2S$); conjugate bases of hydrosulfuric, such as hydrogen sulfide ($[HS]^-$); alkaline salts thereof, rare earth salts thereof, other salts thereof, or any mixture thereof. Exemplary nitrogen-containing acids can include nitric acid ($HNO_3$); conjugate bases of nitric acid nitrate $[NO_3]^-$; nitrous acid ($HNO_2$); conjugate bases of nitrous acid nitrite $[NO_2]^-$; alkaline salts thereof, rare earth salts thereof, other salts thereof, or any mixture thereof.

In other embodiments, suitable acids that can be contained in or used to form the latent acid can include, but are not limited to, organic mineral acids that can include organic sulfonic acids ($R^4S(O)_2OH$), organic phosphoric acids ($R^4OP(OH)_3$), organic phosphorous acids ($R^4P(O)(OH)_2$), organic nitric acids ($R^4NO_3$), organic nitrous acids ($R^4NO_2$), organic sulfamic acids ($R^4HSO_3NH_2$), conjugate bases thereof, alkaline salts thereof, rare earth salts thereof, other salts thereof, or any mixture thereof. The $R^4$-group in the organic mineral acids can include, but are not limited to, phenyl group optionally substituted by a straight or branched chain optionally unsaturated alkyl group 1 carbon atom to about 8 carbon atoms, such as 1 carbon atom to about 4 carbon atoms, for example, 1 carbon atom or 2 carbon atoms, optionally substituted by a hydroxyl group, a halogen (optionally chlorine), and/or a phenyl, aryl, or benzyl group (optionally substituted by a hydroxyl group and/or a straight or branched chain alkyl group containing from 1 to 8 carbons (optionally from 1 to 4 carbons, for example from 1 to 2 carbon atoms)). Suitable organo-mineral acids can include methanesulfonic acid, phenol sulfonic acid, para-toluenesulfonic acid, or xylene sulfonic acid. In some embodiments, the organo-mineral acid can be para-toluenesulfonic acid.

In other embodiments, other suitable acids that can be contained in or used to form the latent acid can include, but are not limited to, halogen-containing acids, such as hydrochloric acid, perchloric acid, hydrofluoric acid, hydrobromic acid, perbromic acid, hydroiodic acid, periodic acid; organic acids, such as oxalic acid, maleic acid, chloroacetic acid, acetic acid, citric acid, trifluoroacetic acid, conjugate bases thereof, alkaline salts thereof, rare earth salts thereof, other salts thereof, or any mixture thereof.

Suitable latent acids can include, but are not limited to, hydroxylamine sulfate, hydroxylamine phosphate, hydroxylamine phenol sulfonate, hydroxylamine p-toluene sulfonate, or any mixture thereof. Such latent acids can be advantageous to form a stabilized solid and can be added to the liquid medium and phenolic resins.

Referring now to the phenolic resin, essentially any phenolic resin or combination of phenolic resins can be combined with the latent acid and liquid medium to produce the resin composition. The phenolic resin can be a phenol-aldehyde resin, such as phenol-formaldehyde (PF) resin. For example, a phenol monomer and an aldehyde monomer in the presence of an acid or base catalyst can form the PF resin. The phenolic resin can be synthesized under controlled molar ratios and reaction conditions. The phenolic monomer and the aldehyde monomer and the catalyst can be directed, charged, or otherwise introduced to a reaction vessel to provide a reaction mixture therein. The resin can be reacted in stages with separate partial additions of either one or both of the reactants and an acid or base catalyst. After an initial exothermic reaction, additional amounts of catalyst and aldehyde can be added to the reaction mixture and the reaction can be continued while controlling the reaction temperature. Once all of the reactants and the catalyst have been added, the reaction can be allowed to proceed to a suitable end point, which can be determined by measuring the refractive index of the reaction mixture, by measuring the viscosity of the reaction mixture, by a combination thereof, or any other suitable reaction endpoint determination, as recognized by those skilled in the art. The phenolic resin can be cooled under vacuum. The phenolic resin can be distilled to remove at least a portion of any liquid medium or solvent present, such as water produced by the condensation reactions.

The reaction mixture can include a liquid medium or solvent. The polymerization reactions in the synthesis of the phenolic resin can generate water, which can be or make up at least a portion of the liquid medium. The liquid medium for the reaction mixture can include water or a variety of non-aqueous solvent such as aromatic solvents including benzene, toluene, xylene, ethylbenzene, and the like. Additional non-aqueous solvents include polar solvents such as furfural, furfuryl alcohol various carbitols, ketones, and various alcohols such as ethylene glycol, benzyl alcohol and the like. The liquid medium can be used in diluting the resin composition to a desired solids concentration or viscosity for certain applications. The liquid medium or solvent for the reaction mixture can be added with the phenolic resin to liquid medium for the resin composition.

The catalyst can be present in an amount from a low of about 0.1 wt %, about 0.3 wt %, about 0.5 wt %, about 0.8 wt %, or about 1 wt % to a high of about 4 wt %, about 5 wt %, or about 6 wt %, based on the combined weight of the phenolic monomer, the aldehyde monomer, the liquid medium, and the catalyst. In another example, the catalyst can be present in an amount of about 0.2 wt % to about 0.4 wt %, about 0.5 wt % to about 0.7 wt %, about 1.0 wt % to about 1.6 wt %, about 2.4 wt % to about 4.0 wt %, or about 3.2 wt % to about 5.8 wt %, based on the combined weight of the phenolic monomer, the aldehyde monomer, the liquid medium, and the catalyst. The catalyst can be added initially to the phenolic monomer and the aldehyde monomer reaction mixture or the catalyst can be added incrementally in two or more additions or continuously over time. These materials can be reacted to a suitable endpoint, e.g., a predetermined viscosity.

The reaction mixture can include one or more catalysts to make the phenolic resin. The catalyst can be present from a low of about 0.001 mol, about 0.01 mol, or about 0.05 mol to a high of about 0.1 mol, about 0.5 mol, about 0.7 mol, or about 1 mol, of catalyst per mol of the phenolic monomer. For example, the catalyst used to make the phenolic resin can be present in an amount of about 0.002 mol to about 0.008 mol, about 0.005 mol to about 0.01 mol, about 0.007 mol to about 0.01 mol, about 0.01 mol to about 0.09 mol, about 0.08 mol to about 0.1 mol, about 0.1 mol to about 0.8 mol, about 0.2 mol to about 1 mol, of catalyst per mol of the phenolic monomer.

Suitable catalysts used to make the phenolic resin ("phenolic resin catalyst") can include one or more bases, one or more acids, and one or more metal salts. Suitable phenolic resin bases for catalyzing and adjusting the pH of the reaction mixture can include, but are not limited to, one or more alkali metal and/or alkali earth hydroxides, such as lithium hydroxide, sodium hydroxide and potassium hydroxide; one or more alkali metal carbonates, such as calcium carbonate, sodium carbonate, and potassium carbonate; and/or one or more amines. For example, the base can include an amine, such triethylenetetraamine.

Suitable acids for catalyzing and adjusting the pH of the reaction mixture can include, but are not limited to, one or more mineral acids, one or more organic acids, one or more acid salts, any combination thereof, or any mixture thereof. Illustrative mineral acids can include, but are not limited to, hydrochloric acid, nitric acid, phosphoric acid, sulfuric acid, or any combination thereof. Illustrative organic acids can include, but are not limited to, acetic acid, formic acid, citric acid, oxalic acid, uric acid, lactic acid, any combination thereof, or any mixture thereof. Illustrative acid salts can include, but are not limited to, ammonium sulfate, sodium bicarbonate, sodium hydrosulfide, sodium bisulfate, sodium metabisulfite, any combination thereof, or any mixture thereof.

The reaction of the phenolic monomer and the aldehyde monomer can be carried out for a time from a low of about 1 minute, about 10 minutes, or about 30 minutes to a high of about 8 hours, about 10 hours, or about 20 hours. For example, polymerization of the phenol and formaldehyde can be carried out for a time of about 10 minutes to about 240 minutes, about 20 minutes to about 180 minutes, about 10 minutes to about 1 hour, about 1 hour to about 7 hours, or about 2 hours to about 20 hours. The polymerization can be carried out until the phenol-aldehyde resin exhibits one or more desired properties. For example, the polymerization of the phenolic monomer and the aldehyde monomer can be carried out until the phenolic resin has a desired viscosity.

The phenolic resin can be prepared by reacting the phenolic monomer and aldehyde monomer at a desired aldehyde to phenolic monomer molar ratio. The aldehyde and phenol monomers can be reacted at an aldehyde monomer to phenolic monomer molar ratio from a low of about 1.3:1, about 1.6:1, or about 1.9:1 to a high of about 2.6:1, about 3.5:1 or about 4:1. For example, phenolic resin can have an aldehyde monomer to phenolic monomer molar ratio can be about 1.9:1 to about 2.6:1, about 2:1 to about 2.3:1, about 1.5:1 to about 2.6:1, about 1.8:1 to about 2.2:1, about 1.7:1 to about 2:1, about 2:1 to about 3.2:1, or about 3.2 to about 4.2:1. The phenolic resin can also be a mixture of phenolic resins prepared at different aldehyde monomer to phenolic monomer molar ratios, with different aldehyde monomers, and/or with different phenolic monomers. For example, the phenolic resin can include a mixture of a first phenolic resin having a low aldehyde monomer to phenolic monomer molar ratio and a second phenolic resin having a high aldehyde monomer to phenolic monomer molar ratio can be used.

The phenolic rein can have a number average molecular weight of at least 225, at least 555, at least 1,400, or at least 2,100. The phenolic rein can have a number average molecular weight of less 3,850, less than 3,000, less than 2,100, or less than 1,500. The phenolic resin can have a number average molecular weight from a low of about 200, about 500, or about 800 to a high of about 1,200, about 2,200, or about 4,000. In another example, the phenolic resin can have a number average molecular weight of about 200 to about 4,000, about 250 to about 550, about 550 to about 950, about 950 to about 1,500, about 1,500 to about 3,500, or about 3,500 to about 3,900. In another example, phenolic resin can have a number average molecular weight of about 275 to about 800, about 700 to about 1,330, about 1,100 to about 2,200, about 2,130 to about 3,000, or about 2,750 to about 4,000.

The viscosity of the phenolic resin can vary widely. The viscosity of the phenolic resin can be at least 25 cP, at least 75 cP, or at least 500 cP at a temperature of about 25° C. The viscosity of the phenolic resin can be less than 1,400 cP, less than 1,000, or less than 800. For example, the viscosity of the phenolic resin can be from a low of about 25 cP, about 100 cP, about 250 cP, or about 500 cP, to a high of about 1,000 cP, about 1,200 cP, or about 1,500 cP at a temperature of about 25° C. In another example, the phenolic resin can have a viscosity of about 25 cP to about 1,500 cP, about 40 cP to about 75 cP, about 75 cP to about 125 cP, about 260 cP to about 460 cP, about 725 cP to about 1,000 cP, about 1,000 cP to about 1,200 cP, about 1,200 cP to about 1,500 cP, or about 7,900 cP to about 9,990 cP at a temperature of about 25° C. The viscosity can be measured using a viscometer, available from Brookfield Engineering Laboratories. For example, the viscometer can be equipped with a small sample adapter such a 10 mL adapter and the appropriate spindle to maximize torque such as a spindle no. 31.

The phenolic resin can have a solids content of at least 25 wt %, at least 30 wt %, at least 35 wt %, at least 40 wt %, at least 45, or at least 55, based on the combined weight of the phenolic resin, the catalyst, and the liquid medium. The phenolic resin can have a solids content of a less than 75 wt %, less than 70 wt %, less than 65 wt %, less than 60 wt %, less than 57%, less than 55 wt %, less than 53 wt %, or less than 50 wt %, based on the combined weight of the phenolic resin, the catalyst, and the liquid medium. For example, the phenolic resin can have a solids content from a low of about 25 wt %, about 35 wt %, or about 45 wt %, to a high of about 60 wt %, about 70 wt %, or about 75 wt %, based on the combined weight of the phenolic resin, the catalyst, and the liquid medium. In other example, phenolic resin can have a solids content of about 25 wt % to about 75 wt %, about 27 wt % to about 39 wt %, about 33 wt % to about 47 wt %, about 45 wt % to about 66 wt %, about 53 wt % to about 70 wt %, or about 60 wt % to about 75 wt %, based on the combined weight of the phenolic resin, the catalyst, and the liquid medium.

The phenolic monomer employed in the formation of suitable phenolic resins can include any phenol that is not substituted at either the two ortho positions or at one ortho and the para position, such unsubstituted positions being beneficial for the desired polymerization reaction to occur. Phenols substituted in these positions can be used in lesser quantities (e.g., up to about 30 wt % of the phenolic monomer to control molecular weight by a chain termination reaction. Any one, all, or none of the remaining carbons of the phenol ring can be substituted. The nature of these substituents can vary widely, and it is only necessary that the substituent not interfere or at least no interfere to an undesirable extent in the polymerization of the aldehyde with the phenol at the ortho and/or para positions thereof (except for molecular weight control as noted above).

Phenol (hydroxybenzene) can be the phenolic monomer, although substituted phenols such as cresol and higher functional phenols such as resorcinol or bisphenol A, can also be used. As such, the phenolic resin can also be or include resorcinol such as phenol-resorcinol-formaldehyde resin or resorcinol-formaldehyde resin. Specific examples of suitable phenolic monomers used in preparing the phenolic resin can include, but are not limited to, resorcinol, bisphenol A, bisphenol F, o-cresol, m-cresol, p-cresol, 3,5-xylenol, 3,4-xylenol, 3,4,5-trimethylphenol, 3-ethyl phenol, 3,5-diethyl phenol, p-butyl phenol, 3,5-dibutyl phenol, p-n-amyl phenol, p-cyclohexyl phenol, p-octyl phenol, 3,5-dicyclohexyl phenol, p-phenyl phenol, p-phenol, 3,5-dimethoxy phenol, 3,4,5-trimethoxy phenol, p-ethoxy phenol, p-butoxy phenol, 3-methyl-4-methoxy phenol, p-phenoxy phenol, naphthol, anthranol and substituted derivatives thereof. Substituted phenolic monomers employed in the formation of the phenolic resins can include, but are not limited to, alkyl substituted phenols, aryl substituted phenols, cycloalkyl substituted phenols, alkenyl-substituted phenols, alkoxy substituted phenols, aryloxy substituted phenols, and halogen-substituted phenols, the foregoing substituents can have 1 carbon atom to about 26 carbon atoms, or 1 carbon atom to about 9 carbon atoms. Specific examples of suitable phenolic monomers for preparing the resin composition can include: phenol, o-cresol, m-cresol, p-cresol, 3,5-xylenol, 3-4-xylenol, 3,4,5-trimethylphenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. In one exemplary embodiment, if the phenol monomer includes a mixture of phenol and one or more other phenolic monomers, about 80 wt % or greater, about 90 wt % or greater, or about 95 wt % or greater of the phenol monomer can be phenol.

The aldehyde monomer reacted with the phenolic monomer similarly can include any of the aldehydes or their equivalents heretofore employed in the formation of phenolic resins including, for example, formaldehyde, acetaldehyde, propionaldehyde, furfuraldehyde, and benzaldehyde. In general, the aldehydes employed have the formula $R^5CHO$ wherein $R^5$ is hydrogen, an alkane of 1 to about 8 carbons or an alkene of 2 to about 8 carbons. Also, it is contemplated that difunctional aldehydes can be used to prepare the phenolic resin, and could advantageously be used to introduce cross-links into the cured resin.

In one exemplary embodiment, an aldehyde monomer can be formaldehyde. In some examples, formaldehyde can be supplied as an aqueous solution (also known as "formalin") can contain about 37 wt % to about 50 wt % of formaldehyde. In other examples, paraformaldehyde can be used as formaldehyde. Other aldehydes can be used in lieu of or in combination with formaldehyde. For example, suitable aldehydes that can be used in lieu of or in combination with formaldehyde can include, but are not limited to, aliphatic aldehydes such as acetaldehyde and propionaldehyde, furfural, glyoxal, crotonaldehyde, aromatic aldehydes such as benzylaldehyde, any combination thereof, or any mixture thereof.

Any commercial phenolic resin can be used with the latent acid. Commercial phenolic resin can include, but is not limited to, GP® RPPY 5763, GP® RPPY 5769, GP® RPPB 295C08, and GP® RPPB 295C13, made by Georgia Pacific Chemicals, LLC.

If the formaldehyde is the aldehyde monomer, then the phenolic resin can have an amount of free or unreacted formaldehyde of about 0.1 wt % to about 6 wt %. For example, the phenolic resin can have a concentration of free formaldehyde from a low of about 0.1 wt %, about 0.5 wt %, about 1 wt %, or about 2 wt % to a high of about 3 wt %, about 5 wt %, or about 6 wt %, based on the total weight of the phenol-formaldehyde resin. The phenol-formaldehyde resin can have an amount of free phenol of about 0.1 wt % to about 20 wt %. For example, the phenol-formaldehyde resin can have a concentration of free formaldehyde from a low of about 0.1 wt %, about 0.5 wt %, about 1 wt %, or about 2 wt % to a high of about 5 wt %, about 7 wt %, about 10 wt %, or about 15 wt %, based on the total weight of the phenol-formaldehyde resin.

One or more formaldehyde scavengers can be added to the phenolic resin to reduce the free formaldehyde content and advantageously impact resin curing. The formaldehyde scavenger can be, but not limited to, urea. In some examples, solid urea, such as prill, and/or urea solutions, such as aqueous solutions, can be used as the formaldehyde scavenger. The urea can be added in an amount from a low of about 0.1 wt %, about 0.5 wt %, about 1 wt %, or about 2 wt % to a high of about 5 wt %, about 7 wt %, about 10 wt %, or about 15 wt %, based on the total weight of the phenolic resin. In other example, the urea can be added to phenolic resin in an amount of about 0.1 wt % to about 1 wt %, about 1 wt % to about 2 wt %, about 2 wt % to about 5 wt %, about 5 wt % to about 10 wt %, about 10 wt % to about 15 wt %, or about 15 wt % to about 20 wt %, based on the total weight of the phenolic resin. The urea can be added to the phenolic resin at room temperature (e.g., about 25° C.) or at an elevated temperature, e.g., about 30° C. to about 60° C.

A liquid medium or solvent can be included in the resin composition. The liquid medium can be added to the resin composition and/or it can be water generated by the polymerization reaction in the synthesis of the phenolic resin. The liquid medium can be used in diluting the resin composition to a desired solids concentration or viscosity for certain applications. One or more solvents can be used in diluting the resin composition to a desired solids concentration or viscosity for certain applications. These solvents can include water or a variety of non-aqueous solvent such as aromatic solvents including benzene, toluene, xylene, ethyl benzene, and the like. Additional non-aqueous solvents can include polar solvents such as furfural, furfuryl alcohol, various carbitols, such as 2-(2-ethoxyethoxy)ethanol, 2-ethoxyethanol, glycol ethers, ketones, and various alcohols such as ethylene glycol, benzyl alcohol, and the like. In some embodiments, the latent acid can be a stabilizing solvent to prevent crystallization of the acid-amine mixture. A skilled person would be able to determine a suitable stabilizing solvent and a suitable amount of such a solvent to use to prevent such crystallization. Examples of suitable stabilizing solvents include water, alcohols, glycols (e.g., ethylene glycol) and ketones. It has been found that acids such as methanesulfonic acid and nitric acid do not generally require a stabilizing solvent when used in a latent acid formulation. Acids such as phosphoric acid, phenolsulfonic acid and p-toluenesulfonic acid can require a stabilizing solvent.

In one or more embodiments, one or more additives can be present in the resin composition. The additives can be added prior, during, or after preparation of the resin composition. The one or more additives can include, but are not limited to, chain terminating phenols, glycols, with or without halogen substitution for additional fire retardancy, polyester polyols, alkyl phenols, hydroxy-containing acrylates, and the like and mixtures thereof. The resin composition can optionally include a plasticizer to increase flexibility of the phenolic resin. The plasticizer can be inert, acid and base compatible, non-volatile, and/or liquid. Illustrative plasticizers can include, but is not limited to, polyvinylacetate and polyethylene glycol. The additives can be present in amount of about 5 wt % to about 35 wt %, based on the combined weight of the additive, the phenolic resin, the latent acid, and the liquid medium.

The resin composition can be used in a variety of lignocellulose composites products. Illustrative composite wood products or articles produced using the resin composition discussed and described herein can include, but are not limited to, particle board; fiberboard such as medium density fiberboard (MDF), hardboard, and high density fiberboard (HDF); plywood, such as hardwood plywood and softwood plywood; oriented strand board (OSB); laminated veneer lumber (LVL); laminated veneer boards (LVB); and the like.

The production of lignocellulose containing composite products can include contacting a plurality of lignocellulose substrates with the resin composition to produce a resinated furnish. The resinated furnish that includes the plurality of lignocellulose substrates can also be referred to as the resin composition if the resin composition has not undergone substantial curing. As such, the resin compositions discussed and described herein can also include a one or more lignocellulose substrates in addition to the phenolic resin, the latent acid, the catalyst, and the liquid medium.

The lignocellulose substrates can be contacted with the resin composition by spraying, coating, mixing, brushing, falling film or curtain coater, dipping, soaking, or the like. After contacting the plurality of lignocellulose substrates with the resin composition, the resin composition can be at least partially cured. At least partially curing the phenolic resin in the resin composition can include applying heat and/or pressure thereto. The phenolic resin in the resinated furnish can also at least partially cure at room temperature (e.g., about 25° C.) and pressure. The lignocellulose substrates contacted with the resin composition can be formed into a desired shape, e.g., a board, a woven mat, or a non-woven mat. The lignocellulose substrates contacted with the resin composition can be formed into a desired shape before, during, and/or after partial curing of the resin composition. Depending, at least in part, on the particular composite product, the lignocellulose substrates contacted with the resin composition can be pressed before, during, and/or after the resin composition at least partially cures. For example, the lignocellulose substrates contacted with the resin composition can be consolidated or otherwise formed into a desired shape, if desired pressed to a particular density and thickness, and heated to at least partially cure the resin composition. In another example, lignocellulose substrates and the resin composition, can be extruded through a die (extrusion process) and heated to at least partially cure the resin composition.

The amount of the resin composition applied, contacted, or otherwise combined with the lignocellulose substrates can range from a low of about 3 wt %, about 4 wt %, about 5 wt % or about 6 wt % to a high of about 10 wt %, about 12 wt %, about 15 wt %, or about 20 wt %, based on a dry weight of the lignocellulose substrates. For example, a lignocellulose composite product can contain about 5 wt % to about 15 wt %, about 8 wt % to about 14 wt %, about 10 wt % to about 12 wt %, or about 7 wt % to about 10 wt % resin composition, based on a dry weight of the lignocellulose substrates.

The resin composition can be applied to the plurality of lignocellulose substrates immediately after preparation of the resin composition or within about 1 minute, about 5 minutes, about 10 minutes, about 30 minutes, about 1 hour, about 2 hours, about 4 hours, about 12 hours, about 24 hours, about 3 months, about 6 months, or about 1 year after preparation of the resin composition. In another example, the resin composition can be applied to the plurality of lignocellulose substrates less than 1 year, less than 6 months, less than 1 month, less than 24 hour, less than 12 hours, less than 1 hour, less than 15 minutes, or less than 1 minute after preparation of the resin composition.

The resin composition catalyst can be added to a mixture of the phenolic resin, the latent catalyst, and the liquid medium to produce the resin composition and/or the resinated furnish in order to raise the pH and aid in the curing process. In one or more embodiments, the amount of resin composition catalyst can depend upon if the base is a monoprotic base or a polyprotic base.

Suitable resin composition catalysts can include, but are not limited to, one or more base compounds and/or one or more metal salts. Suitable base compounds can include, but are not limited to, inorganic bases, organic bases, any combination thereof, or any mixture thereof. Suitable inorganic bases can include, but are not limited, ammonia, sodium hydroxide, ammonium hydroxide, potassium hydroxide, any combination thereof, or any mixture thereof. Suitable organic bases can include, but are not limited to, triethylene tetraamine, diethylene triamine, triethylamine, urea, any combination thereof, or any mixture thereof. Suitable metal salts can include, but are not limited to, sodium nitrate, aluminum sulfate, ammonium hydrogen phosphate, ammonium persulfate, ammonium chloride, ammonium chloride, magnesium chloride, zinc chloride, ammonium nitrate, ammonium sulfate, any combination thereof, or any mixture thereof. A commercially available resin composition catalyst can include, but is not limited to, GP® 4590 k-20 precatalyst made by Georgia-Pacific Chemicals LLC.

As noted above, the phenolic resin of the resin composition can be cured under alkaline conditions. When the resin composition is heated and/or irradiated the acid component can dissociate and/or release from the latent acid. Upon release of the acid component of the latent acid, the pH of the resin composition can decrease. The amount of the latent acid, however, can be limited, maintained, or otherwise controlled such that it is not present in an amount that can reduce the pH of the resin composition below 7 when the acid component is released. As such, the resin composition that includes the latent acid can be cured under basic conditions. For example, the resin composition can be heated to release the acid component of the latent acid and the pH of the resin composition can decrease from about 11.5 to about 8.5. In another example, the resin composition can be at least partially cured at a pH of at least 7, at least 7.3, at least 7.5, at least 7.8, at least 8, at least 8.2, at least 8.4, at least 8.6, at least 8.8, at least 9, at least 9.3, at least 9.5, at least 9.7, or at least 10. The resin composition can be at least partially cured at a pH of less than 13.3, less than 12.9, less than 11.5, or less than 9.7. In another example, the resin composition can be at least partially cured at a pH from a low of about 7.8, about 8, or about 8.2, to a high of about 11.5, about 12, or about 13.5. In yet another example, resin composition can be cured at a pH of about 7.8 to about 8.5, about 8.5 to about 9.5, about 9.5 to about 10.5, about 10.5 to about 11.5, about 11.5 to about 12.5, or about 12.0 to about 13. In yet another example, the resin composition can be at least partially cured at a pH of about 6.9 to about 7.2, about 6.9 to about 7.2, about 7.1 to about 7.4, about 7.3 to about 7.6, about 7.7 to about 8.2, about 7.6 to about 8.6, or about 8.3 to about 9.2.

In at least one specific embodiment, the resin composition catalyst can be or include sodium hydroxide. The amount of sodium hydroxide, if present, can be at least 0.1 wt %, at least 2 wt %, or at least 4 wt %, based on the combined weight of the phenolic resin, the latent acid, the sodium hydroxide, and the liquid medium. The amount of sodium hydroxide can be less than 12 wt %, less than 10 wt %, or less than 5 wt %, based on the combined weight of the phenolic resin, the latent acid, the sodium hydroxide, and the liquid medium. For example, the amount of sodium hydroxide can be from a low of about 0.1 wt %, about 1 wt %, or about 2 wt %, to a high of about 8 wt %, about 10 wt %, or about 12 wt %, based on the combined weight of the phenolic resin, the latent acid, the sodium hydroxide, and the liquid medium. In another example, the amount of sodium hydroxide can be about 2 wt % to about 7 wt %, about 0.2 wt % to about 1.5 wt %, about 1.2 wt % to about 3.5 wt %, about 2.2 wt % to about 6.5 wt %, about 3.2 wt % to about 6.5 wt %, about 3.5 wt % to about 7.5 wt %, about 4.5 wt % to about 8.5 wt %, about 2.5 wt % to about 9.5 wt %, based on the combined weight of the phenolic resin, the latent acid, the base, and the liquid medium.

The amount of the resin composition catalyst in the resinated furnish can be from a low of about 0.00001 wt %, about 0.0001 wt %, about 0.001 wt %, about 0.01 wt %, or about 0.1 wt % to a high of about 0.5 wt %, about 1 wt %, about 1.5 wt %, about 2 wt %, about 3 wt %, about 5 wt %, about 10 wt %, or about 20 wt %, based on the dry weight of the lignocellulose substrates. In another example, the amount of the resin composition catalyst in the resinated furnish can be about 0.01 wt % to about 1.5 wt %, about 0.1 wt % to about 1.3 wt %, about 0.05 wt % to about 0.5 wt %, about 0.07 wt % to about 0.4 wt %, about 0.05 wt % to about 5 wt %, based on the dry weight of the lignocellulose substrates. In another example, the amount of the resin composition catalyst in the resinated furnish can be about 0.001 wt % to about 0.5 wt %, about 0.15 wt % to about 0.35 wt %, about 0.1 wt % to about 0.4 wt %, about 0.1 wt % to about 2 wt %, about 0.05 wt % to about 3 wt %, about 0.05 wt % to about 0.35 wt %, about 0.1 wt % to about 4.5 wt %, about 0.15 wt % to about 4 wt %, about 0.05 wt % to about 3 wt %, or about 0.01 wt % to about 3.5 wt %, based on the dry weight of the lignocellulose substrates.

As used herein, the terms "curing," "cured," and similar terms are intended to embrace the structural and/or morphological change that occurs in a the resin composition, such as by covalent chemical reaction (crosslinking), ionic interaction or clustering, improved adhesion to the substrate, phase transformation or inversion, and/or hydrogen bonding when the resin composition can be at least partially cured to cause the properties of a flexible, porous substrate, such as a wood or other lignocellulose containing substrate, to which an effective amount of the resin composition has been applied, to be altered.

The temperature the resinated furnish or composite product can be heated to produce an at least partially cured composite product can be at least 100° C., at least 115° C., or at least 130° C. The temperature the resinated furnish or composite product can be heated to produce an at least partially cured composite product can be less than 300° C., less than 250° C., less than 225° C., or less than 200° C. The temperature the composite product can be heated to produce an at least partially cured composite product can be from a low of about 100° C., about 125° C., about 150° C., or about 170° C. to a high of about 180° C., about 200° C., about 220° C., about 250° C., or about 300° C.

Any water or liquid medium present in the resinated furnish can at least partially vaporize at the elevated temperature reached during the manufacture of the composite products. The resin composition can be used in the presence of steam or liquid medium vapor. For example, the resin composition can be mixed, blended, combined, or otherwise contacted with one or more lignocellulose substrates in the presence of steam. The manufacture of hardboard, for example, can involve contacting the resin composition with lignocellulose fibers in the presence of steam. High temperatures and/or high vapor pressures can increase the propensity of a phenolic resin that does not contain a latent acid to penetrate the wood. However, the phenolic resin composition containing a latent acid can penetrate the wood furnish less in a given period of time at a given temperature and at a given vapor pressure than a phenolic resin composition that does not contain a latent acid.

The pressure applied in producing the composite product can depend, at least in part, on the particular composite product. The amount of pressure applied to the resinated furnish can be at least 0.5 MPa, at least 0.7 MPa, or at least 1 MPa. The amount of pressure applied to the resinated furnish can be less than 5 MPa, less than 3.7 MPa, or less than 4 MPa. The amount of pressure applied to the resinated furnish can be from a low of about 0.5 MPa, about 1 MPa, or about 1.5 MPa, to a high of about 3.5 MPa, about 4 MPa, or about 5 MPa. For example, the amount of pressure applied to resinated furnish can be about 1 MPa to about 5 MPa or about 2 MPa to about 4 MPa. In another example, the amount of pressure applied to the resinated furnish can be about 0.7 MPa to about 4 MPa, about 0.6 MPa to about 1.2 MPa, about 1 MPa to about 5 MPa, or about 1.1 MPa to about 2.2 MPa.

The length of time the pressure can be applied can range from a low of about 30 seconds, about 1 minute, about 3 minutes, about 5 minutes, or about 7 minutes to a high of about 10 minutes, about 15 minutes, about 20 minutes, or about 30 minutes, which can depend, at least in part, on the particular product and/or the particular dimensions, e.g., thickness of the product.

In some embodiments, it has been found that the temperature used to cure the resin composition can be affected by the weight of the resin composition to be cured. In some embodiments, the temperature used to cure the composition can be increased as the weight of the resin composition is increased. The degree of increase can depend upon several factors. For example, as part of the curing process, at least a portion of the latent acid can dissociate and/or decompose and at least partially volatize from the resin composition; thus an increase in temperature can be balanced against the surface area of the composition. With a heavier or more resin composition on a smaller surface area on lignocellulose substrates, the resin composition can take more time to heat, volatizing at least a portion of the latent acid. Failing to ensure adequate cure can result in blistering of the composite part or plate surface which can be a factor where a smooth surface or aesthetic appearance is desired. A higher temperature can accelerate the dissociation and/or decomposition of the latent acid as well as accelerating the cure reaction. In the light of these considerations, a skilled person should easily be able to determine a suitable cure temperature.

The lignocellulose substrates (material that includes both cellulose and lignin) can include, but is not limited to, straw, hemp, sisal, cotton stalk, wheat, bamboo, sabai grass, rice straw, banana leaves, paper mulberry (e.g., bast fiber), abaca leaves, pineapple leaves, esparto grass leaves, fibers from the genus *Hesperaloe* in the family Agavaceae jute, salt water reeds, palm fronds, flax, ground nut shells, hardwoods, softwoods, recycled fiberboards such as high density fiberboard, medium density fiberboard, low density fiberboard, oriented strand board, particle board, animal fibers (e.g., wool, hair), recycled paper products (e.g., newspapers, cardboard, cereal boxes, and magazines), any combination thereof, or any mixture thereof. Suitable woods can include softwoods and/or hardwoods. Illustrative types of wood can include, but are not limited to, alder, ash, aspen, basswood, beech, birch, cedar, cherry, cottonwood, cypress, elm, fir, gum, hackberry, hickory, maple, oak, pecan, pine, poplar, redwood, sassafras, spruce, sycamore, walnut, and willow.

The starting material, from which the lignocellulose substrates can be derived from, can be reduced to the appropriate size or dimensions by various processes such as hogging, grinding, hammer milling, tearing, shredding, and/or flaking. Suitable forms of the lignocellulose substrates can include, but are not limited to, chips, fibers, shavings, sawdust or dust, or the like. The lignocellulose substrates can have a length from a low of about 0.05 mm, about 0.1 mm, about 0.2 mm to a high of about 1 mm, about 5 mm, about 10 mm, about 20 mm, about 30 mm, about 40 mm, about 50 mm, or about 100 mm.

The method for making the composite lignocellulose containing products can include a continuous or semi-continuous blending process in which the lignocellulose substrates and the other components of the mixture, e.g., the resin composition, can be introduced to a blender at a first or introduction region, end, area, or other location(s) configured to receive the components and the mixture can be withdrawn from the blender via one or more mixture recovery outlets. The blender can be configured to contain anywhere from a few hundred kilograms to several thousand kilograms. For example, in a single blender anywhere from a low of about 500 kg/hr, about 5,000 kg/hr, about 10,000 kg/hr, or about 13,000 kg/hr to a high of about 16,000 kg/hr, about 20,000 kg/hr, about 25,000 kg/hr, or about 30,000 kg/hr of the mixture can be recovered from the blender. As the mixture exits the blender, the mixture can be deposited onto a conveyor belt and can be transported to one or more dryers, moistening systems, presses, and/or other processing equipment. For example, in at least one specific embodiment, a particle board product can be made by blending a first or "face" mixture and a second or "core" mixture in a first and second blender, respectively. The first blender can produce about 13,600 kg/hr to about 15,900 kg/hr of a "face" mixture and the second blender can produce about 18,100 kg/hr to about 20,400 kg/hr of a "core" mixture. The "face" and "core" mixtures can be used to produce a particleboard panel or sheet, where the "face" mixture makes up the outer layers of the particleboard and the "core" mixture makes up the inner or core layer of the particleboard.

Composite products in the shape or form of a panel, sheet, board, or the like can be in the form of a rectangular prism that includes six outer surfaces, e.g., three pairs of oppositely facing surfaces. The first pair of oppositely facing surfaces of the composite product can include a first or "top" surface and an opposing second or "bottom" surface. The second and third pairs of oppositely facing surfaces of the composite product can be referred to as the "side surfaces" that have a surface area less than the surface area of the first and second surfaces. As such, composite products in the shape or form of a panel, sheet, board, or the like can have an average thickness, where the average thickness is the length or distance between the first and second surfaces.

If the composite product is in the form of a panel, sheet, board, or the like, the amount or length of time the mixture can be heated can range from a low of about 5 seconds per millimeter (s/mm), about 10 s/mm, about 12 s/mm, or about 15 s/mm to a high of about 17 s/mm, about 19 s/mm, about 21 s/mm, about 23 s/mm, about 25 s/mm, about 27 s/mm, about 30 s/mm, about 35 s/mm, about 40 s/mm, about 50 s/mm, or about 60 s/mm, where the length refers to the average thickness of the composite product. For example, the mixture can be heated for a time of about 7 s/mm to about 27 s/mm, about 9 s/mm to about 24 s/mm, about 11 s/mm to about 22 s/mm, about 8 s/mm to about 20 s/mm, about 14 s/mm to about 18 s/mm, about 6 s/mm to about 14 s/mm, about 10 s/mm to about 18 s/mm, or about 10 s/mm to about 16 s/mm, where the length refers to the average thickness of the composite product. In another example, the mixture can be heated for a time less than 22 s/mm, less than 20 s/mm, less than 18 s/mm, less than 17 s/mm, less than 16 s/mm, less than 15 s/mm, less than 14 s/mm, less than 13 s/mm, or less than 12 s/mm, where the length refers to the average thickness of the composite product. In one specific example, a composite product in the form of a panel, sheet, board, or the like and having an average thickness of about 15 mm and subjected to a total heating time of about 4 minutes would correspond to heating the mixture for about 16 s/mm. In at least one specific example, the mixture can be heated to a temperature of about 160° C. to about 170° C. for a time of 13 s/mm to about 19 s/mm.

The composite product can have a density from a low of about 0.5 g/cm$^3$, about 0.55 g/cm$^3$, about 0.6 g/cm$^3$, about 0.63 g/cm$^3$, about 0.65 g/cm$^3$, about 0.67 g/cm$^3$, or about 0.7 g/cm$^3$ to a high of about 0.75 g/cm$^3$, about 0.77 g/cm$^3$, about 0.8 g/cm$^3$, about 0.83 g/cm$^3$, about 0.85 g/cm$^3$, about 0.88 g/cm$^3$, about 0.93 g/cm$^3$, about 0.97 g/cm$^3$, about 1 g/cm$^3$, about 1.05 g/cm$^3$, about 1.1 g/cm$^3$, about 1.15 g/cm$^3$, or about 1.2 g/cm$^3$. For example, the composite product can have a density of about 0.7 g/cm$^3$ to about 0.75 g/cm$^3$, about 0.65 g/cm$^3$ to about 0.85 g/cm$^3$, about 0.65 g/cm$^3$ to about 0.8 g/cm$^3$, about 0.67 g/cm$^3$ to about 0.77 g/cm$^3$, about 0.5 g/cm$^3$, to about 1 g/cm$^3$, about 0.5 g/cm$^3$, to about 0.8 g/cm$^3$, about 0.5 g/cm$^3$ to about 0.75 g/cm$^3$, or about 0.64 g/cm$^3$ to about 0.8 g/cm$^3$. In one or more embodiments, the composite product can have density less than 1 g/cm$^3$, less than 0.95 g/cm$^3$, less than 0.88 g/cm$^3$, less than 0.85 g/cm$^3$, less than 0.83 g/cm$^3$, less than 0.8 g/cm$^3$, less than 0.79 g/cm$^3$, less than 0.78 g/cm$^3$, less than 0.77 g/cm$^3$, less than 0.76 g/cm$^3$, less than 0.75 g/cm$^3$, less than 0.74 g/cm$^3$, or less than 0.73 g/cm$^3$.

In one or more embodiments, the composite product can have a density less than 1 g/cm$^3$, less than 0.95 g/cm$^3$, less than 0.9 g/cm$^3$, less than 0.85 g/cm$^3$, less than 0.8 g/cm$^3$, less than 0.79 g/cm$^3$, less than 0.78 g/cm$^3$, less than 0.77 g/cm$^3$, less than 0.76 g/cm$^3$, less than 0.75 g/cm$^3$, less than 0.74 g/cm$^3$, or less than 0.73 g/cm$^3$ and an internal bond strength of at least 0.3 MPa, at least 0.35 MPa, at least 0.4 MPa, at least 0.48 MPa, at least 0.51 MPa, at least 0.55 MPa, at least 0.58 MPa, at least 0.62 MPa, at least 0.65 MPa, or at least 0.69 MPa. In at least one specific example, the composite product can have a density less than 0.8 g/cm$^3$ and internal bond strength of at least 0.48 MPa. In at least one other specific example, the composite product can have a density less than 0.8 g/cm$^3$ and internal bond strength of at least 0.69 MPa. In at least one other specific example, the composite product can have a density of less than 0.73 g/cm$^3$ and internal bond strength of at least 0.48 MPa. In still another example, the composite product can have a density of less than 0.73 g/cm$^3$ and internal bond strength of at least 0.58 MPa.

Referring to particleboard in particular, particleboard made according to one or more embodiments discussed and described herein can meet or exceed the requirements for H-1, H-2, H-3, M-0, M-1, M-S, M-2, M-3i, LD-1, and/or LD-2 grade particleboard as described in the American National Standards Institute (ANSI) for particleboard, i.e., ANSI A208.1-2009 Particleboard, approved Feb. 2, 2009. Particleboard made according to one or more embodiments discussed and described herein can meet or exceed the requirements for PBU, D-2, D-3, and/or M-3 as defined by the ANSI for particleboard, i.e., ANSI A208.1-2009 Particleboard, approved Feb. 2, 2009. For example, Tables A and B set out certain requirements for the different grades of particleboard. Referring to oriented strand board (OSB) in particular, OSB made according to one or more embodiments discussed and described herein can meet or exceed the U.S. Department of Commerce Voluntary Performance Standard PS 2. Referring to plywood in particular, plywood made according to one or more embodiments discussed and described herein can meet or exceed the U.S. Department of Commerce Voluntary Performance Standard PS 1 and/or PS-2.

The resin composition can be applied to the mating surface of one or more veneer or wood plys. The resin composition can be applied to the wood using conventional equipment, including spray nozzles, atomizing wheels, roll coaters, curtain coaters, foam applicators and the like. The amount of resin composition can depend, at least in part, on the characteristics of the veneer to be bonded and the properties desired in the consolidated panel. The resin composition can be applied to the veneer in an amount of between about 40 pounds per 1,000 square feet of double glue line to about 130 pounds per 1,000 square feet of double glue line or about 60 pounds per 1,000 square feet of double glue line to about 120 pounds per 1,000 square feet of double glue line. The particular application rate or amount can differ with different wood sources. For example, for southern pine, which has a higher absorbency capacity than western veneers such as Douglas Fir, it can be desirable to apply a greater adhesive spread.

The starting material, from which the lignocellulose substrates can be derived from, can also be formed into the appropriate size or dimensions by skiving, cutting, slicing, sawing, or otherwise removing a thin layer or sheet from a source of lignocellulose material, e.g., a wood log, to produce a veneer substrate or layer. One or more composite products can be produced from two or more veneer. For example, composite products produced with veneer shaped substrates, in finished form, can include those products referred to as laminated veneer lumber (LVL), laminated veneer boards (LVB), and/or plywood.

The various veneer plys can be assembled into a panel and consolidated at an ambient temperature, e.g., at a temperature of about 15° C. to about 30° C., and at a pressure sufficient to assemble the plys into a coherent article. The plys can be subjected to such pressure until a sufficient initial pre-pressed bond can be obtained to keep the plys from separating or coming apart upon release of the pressure. Pressure of about 172 kPa to about 2,758 kPa can be used. A bond of the required strength can be obtained with a contact time of about 30 seconds to about 20 minutes. After this initial consolidation, the pressure on the plys can be released and they can be stored until they are consolidated at an elevated temperature at which the resin composition cures. For the final press, the panels can be consolidated at a temperature of about 90° C. to about 200° C. and at a pressure of about 517 kPa to about 1,724 kPa. The panels are subjected to these press conditions for a time sufficient to cure the adhesive, which can be about 1 minute to about 20 minutes.

The resin compositions can be used for gluing high average moisture content veneers with reduced blowouts and other moisture induced defects. By using the resin composition, plywood or other lignocellulose composite products can be prepared from a plurality of lignocellulose substrates having an average moisture concentration from a low of about 0.1 wt %, about 1 wt %, about 3 wt %, about 5 wt %, about 7 wt %, or about 9 wt % to a high of about 15 wt %, about 20 wt %, about 25 wt %, about 30 wt %, about 35 wt %, about 40 wt %, about 45 wt %, or about 50 wt %. For example, the lignocellulose substrates can have an average moisture concentration greater than 7 wt %, greater than 8 wt %, greater than 9 wt %, or greater than 10 wt % and up to about 12 wt %, about 14 wt %, about 16 wt %, about 18 wt %, about 20 wt %, about 22 wt %, or more, based on the dry weight of the lignocellulose substrates. In another example, the lignocellulose substrates can have an average moisture concentration greater than 7 wt % and up to about 15 wt %, with spots of moisture as high as 15-20 wt %, based on the dry weight of the lignocellulose substrates. In another example, the lignocellulose substrates can have an average moisture concentration from a low of about 3 wt %, about 5 wt %, about 7 wt %, about 9 wt %, about 11 wt %, or about 13 wt % to a high of about 17 wt %, about 20 wt %, about 22 wt %, or about 25 wt %, based on the dry weight of the lignocellulose substrates. In another example, the lignocellulose substrates can have an average moisture concentration of about 3 wt % to about 5 wt %, about 5 wt % to about 7 wt %, about 7 wt % to about 9 wt %, or about 9 wt % to about 13 wt %, based on the dry weight of the lignocellulose substrates. The lignocellulose substrates can have localized regions or spots of high moisture content. For example, the lignocellulose substrates can have localized regions with a moisture content of about 40 wt %, about 45 wt %, or about 50 wt % with the majority of the lignocellulose substrate having a moisture concentration of less than 30 wt %, e.g., about 7 wt % to about 25 wt %, based on the dry weight of the lignocellulose substrates.

Any suitable system, device, or combination of systems and/or devices can be used to estimate, measure, or otherwise determine the average moisture concentration of the lignocellulose substrates. Illustrative techniques for estimating the moisture concentration can include, but are not limited to, one or more electrical sensors in contact with the first side of the lignocellulose substrate as the lignocellulose substrate moves past the electrical sensor(s), one or more light sources for transmitting light through the lignocellulose substrate and one or more light detectors for sensing the light transmitted through the lignocellulose substrate, interaction of radio frequency signals with the lignocellulose substrate, a radiant energy source directed toward the lignocellulose substrate and a temperature sensor configured to estimate a temperature rise in response to the radiant energy, infrared radiation and detector, neutron beam and detector, or any combination thereof. In one example, the average moisture concentration of the lignocellulose substrates can be determined via one or more electrical sensors, e.g., one or more conductive brushes or other contacts, that can be distributed across a width or length of the lignocellulose substrate and contact the first side of the lignocellulose substrate as the lignocellulose substrate passes by the electrical sensors. Suitable systems and methods for estimating the moisture concentration about veneers and other lignocellulose substrates can include, but are not limited to, those discussed and described in U.S. Pat. Nos. 3,748,578; 6,974,035; 4,683,418; 4,612,802; and 7,068,050. A commercially available system suitable for estimating the moisture concentration of veneer can be the Sequoia Sentry system available from Ventek.

Depending, at least in part, on the particular veneer product that can incorporate the veneer(s), the veneers can have any suitable shape, e.g., rectangular, circular, or any other geometrical shape. The veneers can be rectangular, and can have a width from a low of about 1 cm, about 5 cm, about 10 cm, about 15 cm, about 20 cm, or about 25 cm to a high of about 0.6 m, about 0.9 m, about 1.2 m, about 1.8 m, or about 2.4 m. The veneers can have a length from a low of about 0.3 m, about 0.6 m, about 0.9 m, about 1.2 m, or about 1.8 m to a high of about 2.4 m, or about 3 m, about 3.6 m, about 4.3 m, about 4.9 m, about 5.5 m, about 6.1 m, about 6.7 m, about 7.3 m, or about 7.9 m. For example, in a typical veneer product such as plywood, the veneers can have a width of about 1.2 m and a length of about 2.4 m. The veneers can have a thickness from a low of about 0.8 mm, about 0.9 mm, about 1 mm, about 1.1 mm or about 1.2 mm to a high of about 3 mm, about 4 mm, about 5 mm, about 6 mm, about 7 mm, about 8 mm, about 9 mm, or about 10 mm.

The composite product can have an internal bond strength from a low of about 0.3 MPa, about 0.32 MPa, about 0.34 MPa, about 0.35 MPa, about 0.37 MPa, about 0.4 MPa, about 0.42 MPa, about 0.48 MPa, about 0.52 MPa, about 0.55 MPa, or about 0.58 MPa to a high of about 0.69 MPa, about 0.75 MPa, about 0.83 MPa, about 0.9 MPa, about 0.97 MPa, about 1.05 MPa, about 1.15 MPa, about 1.2 MPa, about 1.25 MPa, about 1.3 MPa, about 1.35 MPa, about 1.4 MPa, about 1.45 MPa, about 1.5 MPa, about 1.55 MPa, about 1.6 MPa, about 1.7 MPa, about 2 MPa, about 2.5 MPa, about 3 MPa, or more. For example, the composite product can have an internal bond strength of about 0.35 MPa to about 0.55 MPa, about 0.4 MPa to about 0.6 MPa, about 0.48 MPa to about 0.69 MPa, about 0.59 MPa to about 0.86 MPa, about 0.55 MPa to about 0.9 MPa, or about 0.51 MPa to about 0.85 MPa. In one or more embodiments, the composite product can have an internal bond strength of at least 0.33 MPa, at least 0.32 MPa, at least 0.34 MPa, at least 0.38 MPa, at least 0.41 MPa, at least 0.45 MPa, at least 0.48 MPa, at least 0.51 MPa, at least 0.55 MPa, at least 0.58 MPa, at least 0.62 MPa, at least 0.66 MPa, at least 0.69 MPa, at least 0.72 MPa, at least 0.76 MPa, or at least 0.79 MPa. The internal bond strength can be determined according to the test procedure provided for in ASTM D1037.

The composite lignocellulose containing products produced with the resin compositions discussed and described herein can exhibit a low level of formaldehyde emission. A suitable test for determining formaldehyde emission from a composite wood product that includes an at least partially cured resin of the resin composition can include ASTM D6007 and ASTM E1333. For example, the composite lignocellulose containing products containing an at least partially cured resin of the resin composition can exhibit a formaldehyde emission of zero. In another example, the composite lignocellulose containing products containing an at least partially cured resin of the resin composition can exhibit a formaldehyde emission of less than 1 part per million ("ppm"), less than 0.9 ppm, less than 0.08 ppm, less than 0.07 ppm, less than 0.06 ppm, less than 0.05 ppm, less than 0.04 ppm, less than 0.03 ppm, less than 0.02 ppm, less than 0.01 ppm, or less than 0.005 ppm.

EXAMPLES

In order to provide a better understanding of the foregoing discussion, the following non-limiting examples are offered. Although the examples can be directed to specific embodiments, they are not to be viewed as limiting the invention in any specific respect.

OSB Panel Study

Two OSB panel studies were conducted. For each study, two sets of single layer panels were made; one with the comparative resin composition ("OSB C1" and "OSB C2") and the other with the inventive resin composition ("OSB Ex. 1" and "OSB Ex. 2") that contained the latent acid. A press time series of four panels was made for each of the comparative resin compositions, which is labeled "OSB C1," and the inventive resin composition, which is labeled "OSB Ex. 1." The phenolic resin used in the tow OSB panel studies was a phenol formaldehyde resin that had a formaldehyde to phenol molar ratio (F:P) of 2.5 and a number average molecular weight of 1,750. The amount of the phenol formaldehyde resin, on a resin solids basis, applied to the wood substrates for both OSB C1 and OSB Ex. 1 was 3.2 wt %, based on the oven dried weight of the wood substrates. The latent acid for the inventive example was an amine salt of triethylamine and sulfuric acid. The amount of latent acid was 3 wt %, based on the solids weight of the phenol formaldehyde resin. The phenolic resin in both OSB C1 and OSB Ex. 1 was cured in the presence of 5 wt % of NaOH, based on the solids weight of the phenol formaldehyde resin. The manufacturing conditions for the first press time series are detailed in Table 1 below.

TABLE 1

Panel Manufacturing Conditions for First Time Press Series

| | |
|---|---|
| Furnish | Southern Yellow Pine, Screened 5.5% to 6.5% Moisture Content |
| Wax | 1.0 wt % Slack Wax |
| Resin Loading | 3.2 wt % Liquid based on Solids on oven dried wood weight |
| Resin Combinations | Set 1: OSB C1 phenol formaldehyde resin composition with no latent acid addition Set 2: OSB EX. 1 resin with latent acid addition (OSB Ex. 1) |
| Panel | 7/16 in. × 18 in. × 18 in. at 43 pounds per cubic foot target density Single layer non-oriented |
| Pressing (Wabash Metals Hydraulic Press) 2 ft × 2 ft platens | 410 ± 10° F. platen temperature Press Times: Series (120, 135, 150, 180 seconds) 45 second target close time Press Times are button to open |

The internal bond (TB) strength was tested using 10-2×2 inch panels. The tensile strength perpendicular to surface test method used to measure the IB strength was the American Standard Test Methods (ASTM) 1037-06a—Sections 28-32. The results are shown in Table 2.

TABLE 2

Least Square Means IB for the First Time Press Series

| Example | PT (s) | Mean IB (psi) | SD | −95% CL | +95% CL | N |
|---|---|---|---|---|---|---|
| OSB C1 | 120 | 68.70 | 5.40 | 58.03 | 79.37 | 10 |
| OSB C1 | 135 | 86.60 | 5.40 | 75.93 | 97.27 | 10 |
| OSB C1 | 150 | 105.26 | 5.40 | 94.58 | 115.93 | 10 |
| OSB C1 | 180 | 106.42 | 5.40 | 95.75 | 117.09 | 10 |
| OSB Ex. 1 | 120 | 77.71 | 5.40 | 67.03 | 88.38 | 10 |
| OSB Ex. 1 | 135 | 93.72 | 5.40 | 83.05 | 104.39 | 10 |
| OSB Ex. 1 | 150 | 97.95 | 5.40 | 87.28 | 108.62 | 10 |
| OSB Ex. 1 | 180 | 128.76 | 5.40 | 118.08 | 139.43 | 10 |

As shown in Table 2, OSB Ex. 1 showed a higher mean IB than the comparative resin OSB C1 at the 120, 135, and 180 seconds press times. Table 3 shows a comparison for the mean of the OSB Ex. 1 with the mean of the OSB C1.

TABLE 3

IB Comparison of the Mean for OSB Ex. 1 and Mean for OSB C1

| Example | PT (s) | Mean IB (psi) | SD | 2.5% CL | 5% CL | 10% CL | Median | 90% CL | 95% CL | 97.5% CL |
|---|---|---|---|---|---|---|---|---|---|---|
| Mean OSB C1 | 120 | 68.79 | 6.74 | 55.22 | 57.91 | 60.43 | 68.83 | 77.08 | 79.59 | 82.14 |
| Mean OSB C1 | 135 | 86.62 | 4.82 | 76.96 | 78.74 | 80.71 | 86.62 | 92.57 | 94.43 | 96.13 |
| Mean OSB C1 | 150 | 105.20 | 3.37 | 98.50 | 99.73 | 101.00 | 105.20 | 109.40 | 110.70 | 111.90 |
| Mean OSB C1 | 180 | 111.10 | 2.61 | 105.80 | 106.80 | 107.90 | 111.10 | 114.30 | 115.30 | 116.30 |
| Mean OSB Ex. 1 | 120 | 74.44 | 6.47 | 61.48 | 63.90 | 66.43 | 74.43 | 82.51 | 85.10 | 87.51 |
| Mean OSB Ex. 1 | 135 | 93.70 | 9.24 | 75.00 | 78.64 | 82.29 | 93.76 | 105.10 | 108.70 | 111.90 |

TABLE 3-continued

IB Comparison of the Mean for OSB Ex. 1 and Mean for OSB C1

| Example | PT (s) | Mean IB (psi) | SD | 2.5% CL | 5% CL | 10% CL | Median | 90% CL | 95% CL | 97.5% CL |
|---|---|---|---|---|---|---|---|---|---|---|
| Mean OSB Ex. 1 | 150 | 102.90 | 2.23 | 98.47 | 99.29 | 100.10 | 102.80 | 105.60 | 106.50 | 107.40 |
| Mean OSB Ex. 1 | 180 | 128.80 | 2.21 | 124.50 | 125.20 | 126.00 | 128.80 | 131.50 | 132.40 | 133.20 |
| Mean Diff. | 120 | 5.64 | 9.36 | −12.99 | −9.68 | −6.02 | 5.64 | 17.31 | 20.78 | 23.55 |
| Mean Diff. | 135 | 7.08 | 10.36 | −13.37 | −9.80 | −5.73 | 7.10 | 20.12 | 23.96 | 27.41 |
| Mean Diff. | 150 | −2.36 | 4.03 | −10.31 | −8.86 | −7.36 | −2.34 | 2.69 | 4.28 | 5.70 |
| Mean Diff. | 180 | 17.68 | 3.40 | 11.10 | 12.22 | 13.46 | 17.68 | 21.97 | 23.27 | 24.55 |
| Total Curve Analysis | All | 24.92 | 13.23 | −1.25 | 3.26 | 8.27 | 24.95 | 41.68 | 46.54 | 50.94 |

At the 97.5% confidence limit (CL), the OSB Ex. 1 outperformed the OSB C1 for 180 seconds. At all other press times there is no statistical difference between OSB Ex. 1 and OSB C1 at the 97.5% CL. However, at the 95.0% CL, a total curve analysis indicates that the OSB Ex. 1 outperformed OSB C1 overall in IB strength.

For the second OSB panel study, a second press time series was developed using four panels for the comparative resin composition "OSB C2," and for the inventive resin composition "OSB Ex. 2." The manufacture conditions used for the second OSB panel study are detailed in Table 4 below. The amount of the resin, NaOH catalyst, and latent acid were the same as in the first OSB panel study.

TABLE 4

Panel Manufacturing Conditions for Second Time Press Series

| | |
|---|---|
| Furnish | Southern Yellow Pine, Screened 5.5% to 6.5% Moisture Content |
| Wax | 1.0% Slack Wax |
| Resin Loading | 3.2% Liquid based on solids on O.D. wood weight |
| Resin Combinations | Set 1: Comparative example of phenol formaldehyde resin composition (OSB C2) Set 2: Inventive example of PF resin with latent acid addition (OSB Ex. 2) |
| Panel | 7/16 in. × 18 in. × 18 in. at 43 pcf target density Single layer non-oriented |
| Pressing (Wabash Metals Hydraulic Press) 2 ft × 2 ft platens | 410 ± 10° F. platen temperature Press Times: Series (120, 135, 150, 165 seconds) 45 second target close time Press Times are button to open |

The IB was measured using 10-2×2 inch panels. The tensile strength perpendicular to surface test method was the American Standard Test Methods (ASTM) 1037-06a—Sections 28-32. The least square means IB for the second time press series results are shown in Table 5.

TABLE 5

Least Square Means IB for the Second Time Press Series

| Example | PT (s) | Mean (psi) | SD | −95% CL | +95% CL | N |
|---|---|---|---|---|---|---|
| Mean OSB C2 | 120 | 35.97 | 4.85 | 26.39 | 45.56 | 10 |
| Mean OSB C2 | 135 | 59.01 | 4.85 | 49.43 | 68.6 | 10 |
| Mean OSB C2 | 150 | 84.02 | 4.85 | 74.43 | 93.6 | 10 |
| Mean OSB C2 | 165 | 65.36 | 4.85 | 55.78 | 74.95 | 10 |
| Mean OSB Ex. 2 | 120 | 50.41 | 4.85 | 40.82 | 59.99 | 10 |
| Mean OSB Ex. 2 | 135 | 62.86 | 4.85 | 53.28 | 72.44 | 10 |
| Mean OSB Ex. 2 | 150 | 73.42 | 4.85 | 63.83 | 83 | 10 |
| Mean OSB Ex. 2 | 165 | 75.44 | 4.85 | 65.86 | 85.03 | 10 |

As shown in Table 5, OSB Ex. 2 provided a higher mean IB than the comparison example (OSB C2) at the 120 and 165 seconds press times.

Table 6 shows a comparison for the mean of the OSB Ex. 2 with the mean of the OSB C2.

TABLE 6

IB Comparison of the Mean for OSB Ex. 2 and Mean for OSB C2

| Example | PT | Mean | SD | 2.5% CL | 5% CL | 10% CL | Median | 90% CL | 95% CL | 97.5% CL |
|---|---|---|---|---|---|---|---|---|---|---|
| Mean OSB C2 | 120 | 36.02 | 4.30 | 27.37 | 29.08 | 30.69 | 36.04 | 41.31 | 42.91 | 44.53 |
| Mean OSB C2 | 135 | 59.04 | 4.56 | 49.91 | 51.59 | 53.45 | 59.04 | 64.67 | 66.43 | 68.04 |
| Mean OSB C2 | 150 | 83.99 | 5.91 | 72.20 | 74.37 | 76.62 | 83.99 | 91.28 | 93.53 | 95.73 |

TABLE 6-continued

IB Comparison of the Mean for OSB Ex. 2 and Mean for OSB C2

| Example | PT | Mean | SD | 2.5% CL | 5% CL | 10% CL | Median | 90% CL | 95% CL | 97.5% CL |
|---|---|---|---|---|---|---|---|---|---|---|
| Mean OSB C2 | 165 | 65.34 | 5.13 | 55.02 | 56.88 | 59.00 | 65.34 | 71.69 | 73.58 | 75.52 |
| Mean OSB Ex. 2 | 120 | 50.44 | 4.74 | 40.94 | 42.72 | 44.57 | 50.43 | 56.35 | 58.25 | 60.02 |
| Mean OSB Ex. 2 | 135 | 62.86 | 4.27 | 54.23 | 55.91 | 57.59 | 62.89 | 68.13 | 69.79 | 71.27 |
| Mean OSB Ex. 2 | 150 | 73.42 | 4.24 | 65.08 | 66.63 | 68.19 | 73.34 | 78.67 | 80.35 | 81.97 |
| Mean OSB Ex. 2 | 165 | 75.51 | 5.35 | 65.15 | 66.88 | 68.92 | 75.47 | 82.09 | 84.20 | 86.20 |
| Mean Difference | 120 | 14.41 | 6.41 | 1.62 | 3.95 | 6.43 | 14.40 | 22.38 | 24.75 | 26.81 |
| Mean Difference | 135 | 3.82 | 6.2 | −8.35 | −6.29 | −3.97 | 3.83 | 11.64 | 13.97 | 16.04 |
| Mean Difference | 150 | −10.57 | 7.24 | −24.88 | −22.30 | −19.62 | −10.50 | −1.46 | 1.33 | 4.01 |
| Mean Difference | 165 | 10.16 | 7.36 | −4.18 | −1.71 | 1.03 | 10.17 | 19.42 | 22.28 | 25.12 |
| Total Curve Analysis | All | 16.13 | 12.4 | −8.3 | −4.21 | 0.49 | 16.12 | 31.72 | 36.32 | 40.74 |

At the 97.5% CL, OSB Ex. 2 outperformed the comparative resin composition (C2) at 120 seconds. At all other press times there was no statistical difference at the 97.5% CL. However, at the 90.0% CL, the total curve analysis indicates that the OSB Ex. 2 outperformed the OSB C2 overall in IB strength.

A water absorption (WA) test and a thickness swell (TS) test were performed on 2-6×6 inch panels made from the comparative and inventive resin compositions of the second OSB panel study. The water absorption and thickness swell methods were conducted according to ASTM 1037-06a—Sections 100-103, 105-107. The samples were soaked for 24 hours in 20° C. water, and the amount of water absorbed and the amount the panel swelled was measured. The thickness swell measurement was taken 1 inch from the edge of the sample. The edge thickness swell (ETS) was also measured. The least square means for the WA, TS, and ETS tests for OSB Ex. 2 and OSB C2 are shown in Tables 7A-7C.

TABLE 7A

Least Square Means Water Absorption for OSB Ex. 2 and Mean for OSB C2

| | | 24 hr WA | | | | |
|---|---|---|---|---|---|---|
| Ex. | PT (S) | Mean (%) | SD | −95% CL | +95% CL | N |
| OSB C2 | 120 | 65.64 | 5.79 | 52.30 | 78.98 | 2 |
| OSB C2 | 135 | 69.44 | 5.79 | 56.10 | 82.78 | 2 |
| OSB C2 | 150 | 57.63 | 5.79 | 44.29 | 70.98 | 2 |
| OSB C2 | 165 | 70.73 | 5.79 | 57.38 | 84.07 | 2 |
| OSB Ex. 2 | 120 | 62.27 | 5.79 | 48.92 | 75.61 | 2 |
| OSB Ex. 2 | 135 | 58.07 | 5.79 | 44.73 | 71.42 | 2 |
| OSB Ex. 2 | 150 | 61.30 | 5.79 | 47.96 | 74.64 | 2 |
| OSB Ex. 2 | 165 | 54.29 | 5.79 | 40.95 | 67.63 | 2 |

TABLE 7B

Least Square Means Thickness Swell for OSB Ex. 2 and Mean for OSB C2

| | | 24 hr TS | | | | |
|---|---|---|---|---|---|---|
| Ex. | PT (s) | Mean (%) | SD | −95% CL | +95% CL | N |
| OSB C2 | 120 | 29.97 | 1.34 | 26.87 | 33.07 | 2 |
| OSB C2 | 135 | 29.79 | 1.34 | 26.7 | 32.89 | 2 |
| OSB C2 | 150 | 24.35 | 1.34 | 21.25 | 27.44 | 2 |
| OSB C2 | 165 | 27.07 | 1.34 | 23.97 | 30.17 | 2 |
| OSB Ex. 2 | 120 | 26.96 | 1.34 | 23.86 | 30.05 | 2 |
| OSB Ex. 2 | 135 | 26.67 | 1.34 | 23.58 | 29.77 | 2 |
| OSB Ex. 2 | 150 | 27.53 | 1.34 | 24.44 | 30.63 | 2 |
| OSB Ex. 2 | 165 | 22.45 | 1.34 | 19.35 | 25.55 | 2 |

TABLE 7C

Least Square Means Edge Thickness Swell for OSB Ex. 2 and Mean for OSB C2

| | | 24 hr ETS | | | | |
|---|---|---|---|---|---|---|
| Ex. | PT (s) | Mean (%) | SD | −95% CL | +95% CL | N |
| OSB C2 | 120 | 30.88 | 1.92 | 26.46 | 35.31 | 2 |
| OSB C2 | 135 | 27.55 | 1.92 | 23.12 | 31.97 | 2 |
| OSB C2 | 150 | 30.51 | 1.92 | 26.08 | 34.93 | 2 |
| OSB C2 | 165 | 28.62 | 1.92 | 24.19 | 33.04 | 2 |
| OSB Ex. 2 | 120 | 29.93 | 1.92 | 25.51 | 34.35 | 2 |
| OSB Ex. 2 | 135 | 24.11 | 1.92 | 19.68 | 28.53 | 2 |
| OSB Ex. 2 | 150 | 28.28 | 1.92 | 23.86 | 32.71 | 2 |
| OSB Ex. 2 | 165 | 24.17 | 1.92 | 19.74 | 28.59 | 2 |

At the 97.5% CL, there is no statistical difference in water absorption, thickness swell or edge thickness swell. At the 90.0% CL, the inventive resin composition is statistically overall better than the comparative resin composition for water absorption.

A comparison for the water absorption of the mean for OSB Ex. 2 and mean for OSB C2 is shown in Table 8.

TABLE 8

Water Absorption Comparison of the Mean for OSB Ex. 2 and Mean for OSB C2

| Example | PT (s) | Mean (%) | SD | 2.5% | 5% | 10% | Median (%) | 90% | 95% | 97.5% |
|---|---|---|---|---|---|---|---|---|---|---|
| Mean OSB C2 | 120 | 65.49 | 6.99 | 52.75 | 55.98 | 58.91 | 65.55 | 72.10 | 74.78 | 78.42 |
| Mean OSB C2 | 135 | 69.43 | 3.23 | 63.22 | 64.78 | 66.22 | 69.48 | 72.64 | 74.07 | 75.42 |
| Mean OSB C2 | 150 | 57.54 | 10.25 | 37.41 | 43.07 | 47.61 | 57.61 | 67.70 | 71.92 | 77.21 |
| Mean OSB C2 | 165 | 70.75 | 5.33 | 60.22 | 63.03 | 65.17 | 70.68 | 76.41 | 78.91 | 81.69 |
| Mean OSB Ex. 2 | 120 | 62.31 | 6.82 | 50.37 | 53.54 | 56.23 | 62.26 | 68.46 | 71.02 | 74.23 |
| Mean OSB Ex. 2 | 135 | 58.10 | 6.80 | 45.10 | 48.66 | 51.55 | 58.07 | 64.64 | 67.62 | 70.89 |
| Mean OSB Ex. 2 | 150 | 61.35 | 4.18 | 53.67 | 55.61 | 57.30 | 61.32 | 65.30 | 67.14 | 69.27 |
| Mean OSB Ex. 2 | 165 | 54.31 | 5.02 | 44.99 | 47.54 | 49.52 | 54.34 | 58.98 | 60.94 | 63.42 |
| Mean Difference | 120 | −3.19 | 9.77 | −20.92 | −17.01 | −13.01 | −3.28 | 6.52 | 10.06 | 14.69 |
| Mean Difference | 135 | −11.34 | 7.48 | −25.88 | −22.26 | −18.94 | −11.35 | −3.67 | −0.68 | 3.02 |
| Mean Difference | 150 | 3.82 | 11.07 | −17.15 | −12.06 | −7.51 | 3.79 | 15.17 | 19.61 | 25.43 |
| Mean Difference | 165 | −16.45 | 7.31 | −30.85 | −27.56 | −24.29 | −16.41 | −8.68 | −5.56 | −1.99 |
| Total Curve Analysis | All | −23.50 | 14.32 | −50.82 | −46.26 | −41.37 | −23.69 | −5.62 | 0.45 | 5.98 |

A comparison for the thickness swell of the mean for OSB Ex. 2 and mean for OSB C2 is shown in Table 9.

TABLE 9

Thickness Swell Comparison of the Mean for OSB Ex. 2 and Mean for OSB C2

| Example | PT (s) | Mean (%) | SD | 2.5% CL | 5% CL | 10% CL | Median (%) | 90% CL | 95% CL | 97.5% CL |
|---|---|---|---|---|---|---|---|---|---|---|
| Mean OSB C2 | 120 | 29.9 | 3.22 | 24.03 | 25.52 | 26.87 | 29.93 | 32.95 | 34.18 | 35.86 |
| Mean OSB C2 | 135 | 29.78 | 3.42 | 23.21 | 24.85 | 26.37 | 29.83 | 33.18 | 34.69 | 36.12 |
| Mean OSB C2 | 150 | 24.31 | 3.51 | 17.43 | 19.38 | 20.92 | 24.34 | 27.79 | 29.23 | 31.03 |
| Mean OSB C2 | 165 | 27.09 | 3.15 | 20.86 | 22.52 | 23.79 | 27.04 | 30.43 | 31.91 | 33.55 |
| Mean OSB Ex. 2 | 120 | 26.98 | 3.34 | 21.15 | 22.7 | 24.02 | 26.95 | 29.98 | 31.23 | 32.79 |
| Mean OSB Ex. 2 | 135 | 26.68 | 3.63 | 19.75 | 21.65 | 23.19 | 26.67 | 30.17 | 31.76 | 33.51 |
| Mean OSB Ex. 2 | 150 | 27.57 | 3.15 | 21.79 | 23.25 | 24.53 | 27.55 | 30.55 | 31.93 | 33.54 |
| Mean OSB Ex. 2 | 165 | 22.45 | 3.27 | 16.39 | 18.05 | 19.33 | 22.48 | 25.49 | 26.77 | 28.38 |
| Mean Difference | 120 | −2.93 | 4.64 | −11.36 | −9.44 | −7.57 | −2.96 | 1.7 | 3.34 | 5.44 |
| Mean Difference | 135 | −3.09 | 4.95 | −12.66 | −10.41 | −8.35 | −3.1 | 2.15 | 4.19 | 6.43 |
| Mean Difference | 150 | 3.26 | 4.71 | −5.52 | −3.7 | −1.75 | 3.24 | 8.06 | 10.28 | 12.64 |

A comparison for the edge thickness swell of the mean for OSB Ex. 2 and mean for OSB C2 is shown in Table 10.

minutes and for 6 minutes, respectively. The manufacturing conditions are detailed in Table 11.

TABLE 10

Edge Thickness Swell Comparison of the Mean for OSB Ex. 2 and Mean for OSB C2

| Example | PT (s) | Mean (%) | SD | 2.5% CL | 5% CL | 10% CL | Median (%) | 90% CL | 95% CL | 97.5% CL |
|---|---|---|---|---|---|---|---|---|---|---|
| Mean OSB C2 | 120 | 30.82 | 3.21 | 24.97 | 26.45 | 27.80 | 30.85 | 33.86 | 35.08 | 36.75 |
| Mean OSB C2 | 135 | 27.53 | 3.14 | 21.51 | 23.01 | 24.41 | 27.58 | 30.65 | 32.04 | 33.35 |
| Mean OSB C2 | 150 | 30.46 | 5.13 | 20.38 | 23.23 | 25.49 | 30.49 | 35.55 | 37.65 | 40.30 |
| Mean OSB C2 | 165 | 28.64 | 2.77 | 23.17 | 24.63 | 25.74 | 28.60 | 31.57 | 32.86 | 34.31 |
| Mean OSB Ex. 2 | 120 | 29.95 | 3.40 | 24.02 | 25.60 | 26.94 | 29.93 | 33.01 | 34.28 | 35.87 |
| Mean OSB Ex. 2 | 135 | 24.12 | 3.76 | 16.92 | 18.89 | 20.49 | 24.10 | 27.74 | 29.39 | 31.20 |
| Mean OSB Ex. 2 | 150 | 28.33 | 3.20 | 22.45 | 23.93 | 25.23 | 28.30 | 31.34 | 32.76 | 34.38 |
| Mean OSB Ex. 2 | 165 | 24.17 | 3.68 | 17.34 | 19.21 | 20.66 | 24.20 | 27.60 | 29.03 | 30.85 |
| Mean Difference | 120 | −0.87 | 4.68 | −9.35 | −7.44 | −5.55 | −0.90 | 3.80 | 5.46 | 7.54 |
| Mean Difference | 135 | −3.41 | 4.86 | −12.77 | −10.60 | −8.56 | −3.42 | 1.72 | 3.80 | 5.96 |
| Mean Difference | 150 | −2.13 | 6.04 | −13.59 | −10.80 | −8.43 | −2.14 | 4.08 | 6.77 | 9.65 |
| Mean Difference | 165 | −4.46 | 4.60 | −13.29 | −11.37 | −9.28 | −4.42 | 0.41 | 2.17 | 4.43 |
| Total Curve Analysis | All | −10.35 | 9.18 | −28.36 | −25.12 | −21.67 | −10.35 | 0.75 | 4.50 | 8.43 |

Plywood Panel Study

One Plywood panel study was conducted. Three types of panels were made using a low moisture content (MC) veneer, e.g., 6 wt % to 7 wt % moisture, a higher moisture content veneer, e.g., 12 wt % to 14 wt % moisture, and veneer made under dry-out condition. For the veneer made under dry-out conditions, both sides of the veneer were coated with the resin composition and placed in an oven at a temperature 160-180° C. for the time shown below in Table 11, and the plywood was made with this veneer.

A press time series of three press times was conducted with the low moisture content veneer. Two panels were made at each press time with a comparative resin composition, which is labeled "Ply C3," and an inventive resin composition, which is labeled "Ply Ex. 3." The phenolic resin used for both the comparative examples and the inventive examples was a phenol formaldehyde resin with a formaldehyde to phenol molar (F:P) ratio of 2.2 and a number average molecular weight of 2,800. The amount of the phenol formaldehyde resin, on a resin solids basis, applied to the veneers for both Ply C3 and Ply Ex. 3 was 30 g/144 square inches of surface area. The latent acid for the inventive examples was an amine salt of triethylamine and sulfuric acid. The amount of latent acid was 0.47 wt %, based on the total weight of the resin composition. The phenolic resin was cured in the presence of 6 wt % NaOH, based on the total weight of the resin composition. Two plywood panels were made at two different press times for the high moisture content veneer. For the dry-out conditions, two panels were made by spreading the resin compositions on the veneer and placing it into an oven at 150° F. for 3

TABLE 11

Plywood Panel Manufacturing Conditions

| | |
|---|---|
| Veneer | Southern Yellow Pine |
| | 12 × 12 × ⅛$^{th}$ inch |
| Resin Loading | 27-29 g/ft$^2$ DGL (double glue line) |
| Resin | Set 1: Comparative example of phenol formaldehyde resin composition (Ply C3) |
| | Set 2: Inventive example of PF resin with latent acid addition (Ply Ex. 3) |
| Panel | 5 ply |
| Pressing | 310 ± 10° F. platen temperature |
| 2 ft × 2 ft platens | Press Times: Low MC % Series (288, 306, 324 seconds) |
| | Press Times: High MC % (378, 396 seconds) |
| | Press Times: Dry-out (390 seconds) |
| | Dry-out Times: 3 and 6 minutes |

For each resin composition, IB strength was tested on 6-2×2 inch panels. The panels were cycled under 30 min of vacuum followed by 30 min of pressure in water at room temperature (e.g., about 25° C.). The panels were then dried for approximately 15 hours in a 180° F. oven. The wood failure (WF) percentage was also determined for each panel. Table 12 shows the least square mean for the IB and the WF for the comparative and inventive resin compositions on the low moisture content veneers.

TABLE 12

Least Square Means IB and WF for Low MC Plywood

| | | IB | | | | WF | | | | |
|---|---|---|---|---|---|---|---|---|---|---|
| Example | PT (s) | Mean (psi) | SD | −95% CL | +95% CL | Mean | SD | −95% CL | +95% CL | N |
| Ply C3 | 288 | 58.97 | 9.97 | 39.06 | 78.87 | 51.67 | 5.63 | 40.42 | 62.91 | 12 |
| Ply C3 | 306 | 95.41 | 9.97 | 75.5 | 115.31 | 45.83 | 5.63 | 34.59 | 57.08 | 12 |
| Ply C3 | 324 | 106.51 | 9.97 | 86.61 | 126.41 | 60 | 5.63 | 48.75 | 71.25 | 12 |
| Ply Ex. 3 | 288 | 66.49 | 9.97 | 46.58 | 86.39 | 19.17 | 5.63 | 7.92 | 30.41 | 12 |
| Ply Ex. 3 | 306 | 103.92 | 9.97 | 84.02 | 123.83 | 55.83 | 5.63 | 44.59 | 67.08 | 12 |
| Ply Ex. 3 | 324 | 91.26 | 9.97 | 71.36 | 111.16 | 24.17 | 5.63 | 12.92 | 35.41 | 12 |

The inventive resin composition was comparable in IB to the comparative resin composition at all press times for the low moisture content veneers. The inventive resin composition had a higher wood failure at the 306 seconds press time, but a lower wood failure at the 288 and 324 seconds press times.

Table 13 shows the least square mean for the IB and the WF for the comparative and inventive resin compositions on the high moisture content veneers.

TABLE 13

Least Square Means IB and WF for High MC Plywood

| | | IB | | | | WF | | | | |
|---|---|---|---|---|---|---|---|---|---|---|
| Example | PT (s) | Mean (psi) | SD | −95% CL | +95% CL | Mean | SD | −95% CL | +95% CL | N |
| Ply C3 | 378 | 55.87 | 10.21 | 35.27 | 76.46 | 19.55 | 5.35 | 8.76 | 30.33 | 12 |
| Ply C3 | 396 | 59.66 | 9.78 | 39.95 | 79.37 | 28.75 | 5.12 | 18.43 | 39.07 | 12 |
| Ply Ex. 3 | 378 | 135.03 | 9.78 | 115.32 | 154.75 | 40 | 5.12 | 29.68 | 50.32 | 12 |
| Ply Ex. 3 | 396 | 97.07 | 9.78 | 77.36 | 116.79 | 30.83 | 5.12 | 20.51 | 41.16 | 12 |

Table 14 shows the least square mean for the IB and the WF for the comparative and inventive resin compositions on the dry-out condition veneers.

TABLE 14

Least Square Means IB and WF for Dry-out Condition Panels

| | Dry-out Time | IB | | | | WF | | | | |
|---|---|---|---|---|---|---|---|---|---|---|
| Example | (min) | Mean | SD | −95% | 95% | Mean | SD | −95% CL | +95% CL | N |
| Ply C3 | 3 | 105.09 | 5.63 | 93.75 | 116.43 | 88.33 | 2.30 | 83.69 | 92.98 | 12 |
| Ply C3 | 6 | 93.15 | 5.63 | 81.81 | 104.48 | 88.75 | 2.30 | 84.11 | 93.39 | 12 |
| Ply Ex. 3 | 3 | 130.10 | 5.63 | 118.76 | 141.43 | 91.25 | 2.30 | 86.61 | 95.89 | 12 |
| Ply Ex. 3 | 6 | 94.60 | 5.63 | 83.27 | 105.94 | 87.92 | 2.30 | 83.27 | 92.56 | 12 |

Table 14 shows the least square mean for the IB and the WF for the comparative and inventive resin compositions on the dry-out condition veneers.

Table 15 shows a comparison of the IB for the comparative and inventive resin compositions on the low moisture content veneers.

TABLE 15

IB Comparison of Inventive and Comparative Resin Compositions for Low MC Plywood-

| Example | PT (s) | Mean | SD | 2.5% CL | 5% CL | 10% CL | Median | 90% CL | 95% CL | 97.5% CL |
|---|---|---|---|---|---|---|---|---|---|---|
| Ply C3 | 288 | 59.08 | 9.58 | 40.02 | 43.2 | 47.05 | 59.02 | 70.86 | 74.59 | 78.01 |
| Ply C3 | 306 | 95.60 | 10.80 | 74.09 | 77.84 | 82.21 | 95.58 | 109.30 | 113.30 | 117.40 |
| Ply C3 | 324 | 106.30 | 10.74 | 84.61 | 88.61 | 93.08 | 106.50 | 119.80 | 123.70 | 127.30 |
| Ply Ex. 3 | 288 | 66.45 | 9.10 | 48.40 | 51.74 | 55.31 | 66.50 | 77.80 | 81.14 | 84.27 |
| Ply Ex. 3 | 306 | 104.10 | 9.18 | 86.30 | 89.58 | 92.77 | 103.90 | 115.60 | 119.10 | 122.50 |
| Ply Ex. 3 | 324 | 91.31 | 10.44 | 70.49 | 74.4 | 78.32 | 91.25 | 104.20 | 108.50 | 112.10 |
| Mean Diff | 288 | 7.38 | 13.21 | −18.16 | −14.33 | −9.26 | 7.28 | 23.96 | 29.19 | 33.38 |
| Mean Diff | 306 | 8.47 | 14.10 | −19.47 | −14.49 | −9.15 | 8.19 | 26.37 | 31.51 | 36.11 |
| Mean Diff | 324 | −15.03 | 14.85 | −44.19 | −39.22 | −33.54 | −14.87 | 3.48 | 9.23 | 14.52 |
| Total Curve Analysis | All | 0.58 | 16.96 | −32.63 | −27.23 | −21.02 | 0.32 | 22.35 | 28.66 | 34.72 |

Table 16 shows a comparison of the IB for the comparative and inventive resin compositions on the high moisture content veneers.

TABLE 16

IB Comparison of Inventive and Comparative Resin Compositions for High MC Plywood

| Example | PT (s) | Mean (psi) | SD | 2.5% | 5% | 10% | Median (psi) | 90% | 95% | 97.5% |
|---|---|---|---|---|---|---|---|---|---|---|
| Ply C3 | 378 | 55.92 | 8.72 | 38.73 | 41.81 | 45.04 | 55.92 | 66.89 | 70.21 | 73.32 |
| Ply C3 | 396 | 59.72 | 8.32 | 43.24 | 46.25 | 49.33 | 59.74 | 70.04 | 73.38 | 76.26 |
| Ply Ex. 3 | 378 | 134.80 | 13.62 | 107.30 | 112.70 | 117.80 | 135.00 | 151.70 | 156.80 | 161.80 |
| Ply Ex. 3 | 396 | 96.94 | 7.14 | 82.72 | 85.45 | 88.19 | 96.87 | 105.80 | 108.40 | 111.20 |
| Mean Diff | 378 | 78.89 | 16.12 | 46.72 | 52.09 | 58.46 | 78.96 | 99.21 | 104.80 | 110.10 |
| Mean Diff | 396 | 37.22 | 10.96 | 15.41 | 19.25 | 23.43 | 37.25 | 51.25 | 55.31 | 58.58 |
| Total Curve Analysis | All | 82.11 | 14.90 | 51.77 | 57.27 | 63.15 | 82.49 | 100.90 | 106.00 | 110.30 |

Table 17 shows a comparison of the IB for the comparative and inventive resin compositions on the dry-out veneers.

TABLE 17

IB Comparison of Inventive and Comparative Resin Compositions for Dry-out Veneers

| Example | PT (s) | Mean (psi) | SD | 2.5% CL | 5% CL | 10% CL | Median (psi) | 90% CL | 95% CL | 97.5% CL |
|---|---|---|---|---|---|---|---|---|---|---|
| Ply C3 | 3 | 105.20 | 8.44 | 88.30 | 91.42 | 94.68 | 105.20 | 115.60 | 119.00 | 121.90 |
| Ply C3 | 6 | 93.20 | 3.75 | 85.84 | 87.11 | 88.51 | 93.19 | 97.91 | 99.36 | 100.60 |
| Ply Ex. 3 | 3 | 130.10 | 3.94 | 122.40 | 123.70 | 125.20 | 130.10 | 134.90 | 136.50 | 137.90 |
| Ply Ex. 3 | 6 | 94.58 | 5.19 | 84.28 | 86.15 | 88.08 | 94.57 | 100.90 | 102.90 | 104.90 |
| Mean Diff | 3 | 24.90 | 9.29 | 6.36 | 9.69 | 13.25 | 24.97 | 36.71 | 40.14 | 43.02 |
| Mean Diff | 6 | 1.39 | 6.45 | −11.35 | −9.30 | −6.70 | 1.35 | 9.40 | 11.85 | 14.36 |
| Total Curve Analysis | All | 23.05 | 9.92 | 3.28 | 6.51 | 10.25 | 23.25 | 35.67 | 39.35 | 42.47 |

Table 18 shows a comparison of the WF for the comparative and inventive resin compositions on the low moisture content veneers.

TABLE 18

WF Comparison of Inventive and Comparative Resin Compositions for Low MC Plywood-

| Example | PT (s) | Mean (%) | SD | 2.5% | 5% | 10% | Median (%) | 90% CL | 95% CL | 97.5% CL |
|---|---|---|---|---|---|---|---|---|---|---|
| Ply C3 | 288 | 51.72 | 4.55 | 42.68 | 44.19 | 46.02 | 51.69 | 57.31 | 59.08 | 60.71 |
| Ply C3 | 306 | 45.96 | 7.17 | 31.69 | 34.17 | 37.07 | 45.95 | 55.04 | 57.70 | 60.43 |
| Ply C3 | 324 | 59.91 | 5.82 | 48.14 | 50.30 | 52.72 | 59.99 | 67.19 | 69.33 | 71.25 |
| Ply Ex. 3 | 288 | 19.15 | 3.19 | 12.84 | 14.00 | 15.25 | 19.17 | 23.12 | 24.29 | 25.39 |
| Ply Ex. 3 | 306 | 55.94 | 6.77 | 42.83 | 45.26 | 47.61 | 55.84 | 64.48 | 67.06 | 69.56 |
| Ply Ex. 3 | 324 | 24.19 | 5.57 | 13.09 | 15.18 | 17.27 | 24.16 | 31.04 | 33.33 | 35.28 |
| Mean Diff | 288 | −32.57 | 5.55 | −43.49 | −41.51 | −39.52 | −32.60 | −25.64 | −23.36 | −21.57 |
| Mean Diff | 306 | 9.98 | 9.82 | −9.48 | −6.00 | −2.26 | 9.83 | 22.46 | 26.04 | 29.30 |
| Mean Diff | 324 | −35.72 | 7.98 | −51.37 | −48.73 | −45.66 | −35.63 | −25.77 | −22.72 | −19.84 |
| Total Curve Analysis | All | −51.11 | 12.22 | −74.79 | −71.05 | −66.58 | −51.25 | −35.39 | −30.51 | −26.28 |

For low moisture content veneers, the inventive resin composition was comparable to the comparative resin composition at 306 seconds at a 97.5 confidence limit. Overall, the comparative resin composition outperformed the inventive resin composition.

Table 19 shows a comparison of the WF for the comparative and inventive resin compositions on the high moisture content veneers.

TABLE 19

WF Comparison of Inventive and Comparative Resin Compositions for High MC Plywood

| Example | PT (s) | Mean (%) | SD | 2.5% CL | 5% CL | 10% CL | Median (%) | 90% CL | 95% CL | 97.5% CL |
|---|---|---|---|---|---|---|---|---|---|---|
| Ply C3 | 378 | 19.60 | 6.54 | 6.72 | 9.02 | 11.44 | 19.59 | 27.82 | 30.30 | 32.64 |
| Ply C3 | 396 | 28.78 | 4.52 | 19.81 | 21.45 | 23.13 | 28.79 | 34.39 | 36.21 | 37.78 |
| Ply Ex. 3 | 378 | 39.92 | 5.12 | 29.58 | 31.59 | 33.52 | 39.99 | 46.28 | 48.18 | 50.06 |
| Ply Ex. 3 | 396 | 30.75 | 4.43 | 21.93 | 23.62 | 25.32 | 30.71 | 36.24 | 37.89 | 39.59 |
| Mean Diff | 378 | 20.33 | 8.28 | 3.86 | 6.61 | 9.76 | 20.36 | 30.65 | 33.55 | 36.46 |
| Mean Diff | 396 | 1.97 | 6.33 | −10.59 | −8.35 | −5.97 | 1.95 | 10.04 | 12.36 | 14.45 |
| Total Curve Analysis | All | 19.95 | 9.31 | 1.57 | 4.62 | 7.95 | 20.17 | 31.69 | 35.03 | 37.91 |

At the 97.5% CL, the inventive resin composition outperformed the comparative resin composition overall for the high moisture content veneers.

Table 20 shows a comparison of the WF for the comparative and inventive resin compositions on the dry-out veneers.

TABLE 20

WF Comparison of Inventive and Comparative Resin Compositions for Dry-out Veneers

| Example | PT (s) | Mean (%) | SD | 2.5% CL | 5% CL | 10% CL | Median (%) | 90% CL | 95% CL | 97.5% CL |
|---|---|---|---|---|---|---|---|---|---|---|
| Ply C3 | 3 | 88.37 | 3.81 | 80.76 | 82.17 | 83.64 | 88.38 | 93.09 | 94.60 | 95.92 |
| Ply C3 | 6 | 88.76 | 1.98 | 84.89 | 85.56 | 86.29 | 88.76 | 91.24 | 92.01 | 92.68 |
| Ply Ex. 3 | 3 | 91.24 | 1.30 | 88.71 | 89.14 | 89.64 | 91.25 | 92.85 | 93.37 | 93.84 |
| Ply Ex. 3 | 6 | 87.91 | 1.36 | 85.21 | 85.70 | 86.21 | 87.91 | 89.57 | 90.09 | 90.61 |
| Mean Diff | 3 | 2.87 | 4.01 | −5.13 | −3.81 | −2.16 | 2.91 | 7.93 | 9.47 | 10.74 |
| Mean Diff | 6 | −0.85 | 2.42 | −5.64 | −4.87 | −3.91 | −0.86 | 2.14 | 3.13 | 3.92 |

TABLE 20-continued

WF Comparison of Inventive and Comparative Resin Compositions for Dry-out Veneers

| Example | PT (s) | Mean (%) | SD | 2.5% CL | 5% CL | 10% CL | Median (%) | 90% CL | 95% CL | 97.5% CL |
|---|---|---|---|---|---|---|---|---|---|---|
| Total Curve Analysis | All | 1.98 | 4.59 | −7.11 | −5.64 | −3.90 | 2.01 | 7.85 | 9.64 | 11.00 |

At the 97.5% CL, Ply Ex. 3 was comparable with the comparative resin composition for the dry-out veneers.

The addition of a latent acid to OSB and plywood resin compositions showed a 90% statistical improvement for all moisture contents of the veneers. The most noticeable improvements were seen when higher moisture content wood was used. This further supports the thought that the resin solubility is reduced and the resin resists over penetration. Also, the experiments have shown that the inventive resin composition can outperform the comparative resin composition for dry-out veneers.

Embodiments of the present disclosure further relate to any one or more of the following paragraphs:

1. A resin composition, comprising a phenolic resin, a latent acid, a catalyst, and a liquid medium, wherein the catalyst comprises a base compound present in an amount of about 2 wt % to about 7 wt %, based on the combined weight of the phenolic resin, the latent acid, the catalyst, and the liquid medium.

2. The resin composition according to paragraph 1, wherein the phenolic resin is present in an amount of about 20 wt % to about 50 wt %, the latent acid is present in an amount of about 0.3 wt % to about 10 wt %, and the liquid medium is present in an amount of about 40 wt % to about 70%, based on the combined weight of the phenolic resin, the latent acid, the catalyst, and the liquid medium.

3. The resin composition according to any one of paragraphs 1 or 2, wherein the phenolic resin comprises a phenol formaldehyde resin having a formaldehyde to phenol molar ratio of about 1.9:1 to about 2.6:1.

4. The resin composition according to any one of paragraphs 1 to 3, wherein the latent acid comprises an amine salt of triethylamine and sulfuric acid.

5. The resin composition according to any one of paragraphs 1 to 4, wherein the latent acid comprises hydroxylamine sulfate, hydroxylamine phosphate, hydroxylamine phenol sulfonate, hydroxylamine p-toluene sulfonate, or any mixture thereof.

6. The resin composition according to any one of paragraphs 1 to 5, wherein the resin composition has a pH of greater than 8.

7. The resin composition according to any one of paragraphs 1 to 6, wherein the resin composition has a pH of about 9 to about 11.5.

8. A method for making a composite product, comprising: mixing a plurality of lignocellulose substrates a resin composition to produce a resinated furnish, wherein the resin composition comprises a phenolic resin, a latent acid, a catalyst, and a liquid medium, and wherein the catalyst comprises a base compound and is present in an amount of about 2 wt % to about 7 wt %, based on the combined weight of the phenolic resin, the latent acid, the catalyst, and the liquid medium; and heating the resinated furnish to produce a composite product.

9. The method according to paragraph 8, wherein the phenolic resin is present in an amount of about 20 wt % to about 50 wt %, the latent acid is present in an amount of about 0.3 wt % to about 10 wt %, and the liquid medium is present in an amount of about 40 wt % to about 70%, based on the combined weight of the phenolic resin, the latent acid, the catalyst, and the liquid medium.

10. The method according to any one of paragraphs 8 or 9, wherein the phenolic resin comprises a phenol formaldehyde resin having a formaldehyde to phenol molar ratio of about 1.9:1 to about 2.6:1.

11. The method according to any one of paragraphs 8 to 10, wherein the latent acid comprises an amine salt of triethylamine and sulfuric acid.

12. The method according to any one of paragraphs 8 to 11, wherein the latent acid comprises hydroxylamine sulfate, hydroxylamine phosphate, hydroxylamine phenol sulfonate, hydroxylamine p-toluene sulfonate, or any mixture thereof.

13. The method according to any one of paragraphs 8 to 12, wherein the phenolic resin is at least partially cured at a pH of greater than 8.

14. The method according to any one of paragraphs 8 to 13, wherein the phenolic resin is at least partially cured at a pH of about 9 to about 11.5.

15. A composite product, comprising: an at least partially cured resinated furnish, wherein, prior to curing, the resinated furnish comprises a plurality of lignocellulose substrates and a resin composition, wherein the resin composition comprises a phenolic resin, a latent acid, a catalyst, and a liquid medium, and wherein the catalyst comprises a base compound and is present in an amount of about 2 wt % to about 7 wt %, based on the combined weight of the phenolic resin, the latent acid, the catalyst, and the liquid medium.

16. The composite product according to paragraph 15, wherein the phenolic resin is present in an amount of about 20 wt % to about 50 wt %, the latent acid is present in an amount of about 0.3 wt % to about 10 wt %, and the liquid medium is present in an amount of about 40 wt % to about 70%, based on the combined weight of the phenolic resin, the latent acid, the catalyst, and the liquid medium.

17. The composite product according to any one of paragraphs 15 or 16, wherein the phenolic resin comprises a phenol formaldehyde resin having a formaldehyde to phenol molar ratio of about 1.9:1 to about 2.6:1.

18. The composite product according to any one of paragraphs 15 or 17, wherein the latent acid comprises hydroxylamine sulfate, hydroxylamine phosphate, hydroxylamine phenol sulfonate, hydroxylamine p-toluene sulfonate, or any mixture thereof.

19. The composite product according to any one of paragraphs 15 or 18, wherein the phenolic resin is at least partially cured at a pH of greater than 9.

20. The composite product according to any one of paragraphs 15 or 19, wherein the phenolic resin is at least partially cured at a pH of about 9 to about 11.5.

21. The resin composition according to any one of paragraphs 1 to 7, further comprising a plurality of lignocellulose substrates.

22. The resin composition according to any one of paragraphs 1 to 7, further comprising a plurality of lignocellulose substrates having an average moisture concentration of at least 7 wt % to about 30 wt %.

23. The resin composition according to any one of paragraphs 1 to 7, further comprising a plurality of lignocellulose substrates having an average moisture concentration of at least 7 wt % to about 25 wt %.

24. The resin composition according to any one of paragraphs 1 to 7, further comprising a plurality of lignocellulose substrates having an average moisture concentration of at least 10 wt % to about 30 wt %.

25. The resin composition according to any one of paragraphs 1 to 7, further comprising a plurality of lignocellulose substrates having an average moisture concentration of at least 12 wt % to about 30 wt %.

26. The method or composite product according to any one of paragraphs 8 to 20, wherein the plurality of lignocellulose substrates has an average moisture concentration of at least 7 wt % to about 30 wt %.

27. The resin composition, method, or composite product according to any one of paragraphs 1 to 26, wherein the base compound comprises sodium hydroxide.

28. The resin composition, method, or composite product according to any one of paragraphs 1 to 27, wherein the catalyst is present in an amount of about 2 wt % to about 4 wt %, based on the combined weight of the phenolic resin, the latent acid, the catalyst, and the liquid medium.

29. The resin composition, method, or composite product according to any one of paragraphs 1, 8, or 15, wherein the phenolic resin comprises a phenol formaldehyde resin having a formaldehyde to phenol molar ratio of about 1.9:1 to about 2.6:1, the phenolic resin is present in an amount of about 20 wt % to about 50 wt %, the latent acid is present in an amount of about 0.3 wt % to about 10 wt %, and the water is present in an amount of about 40 wt % to about 70 wt %, based on the combined weight of the phenolic resin, the latent acid, the catalyst, and the water, the catalyst is present in an amount of about 2 wt % to about 4 wt %, based on the combined weight of the phenolic resin, the latent acid, the catalyst, and the liquid medium, the catalyst comprises sodium hydroxide, and the resin composition has a pH of greater than 8.

30. The method or composite product according to paragraph 8 or 15, wherein the plurality of lignocellulose substrates have an average moisture concentration of at least 7 wt % to about 25 wt %, the phenolic resin comprises a phenol formaldehyde resin having a formaldehyde to phenol molar ratio of about 1.9:1 to about 2.6:1, the phenolic resin is present in an amount of about 20 wt % to about 50 wt %, the latent acid is present in an amount of about 0.3 wt % to about 10 wt %, and the water is present in an amount of about 40 wt % to about 70 wt %, based on the combined weight of the phenolic resin, the latent acid, the catalyst, and the water, the catalyst is present in an amount of about 2 wt % to about 4 wt %, based on the combined weight of the phenolic resin, the latent acid, the catalyst, and the liquid medium, the catalyst comprises sodium hydroxide, and the resin composition has a pH of greater than 8.

31. The method or composite product of paragraph 29 or 30, wherein the latent acid comprises hydroxylamine sulfate, hydroxylamine phosphate, hydroxylamine phenol sulfonate, hydroxylamine p-toluene sulfonate, or any mixture thereof.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A resin composition, comprising: a phenolic resin, a latent acid, a base compound, and a liquid medium, wherein the resin composition comprises the base compound in an amount sufficient such that the resin composition has a pH of at least 7.5 when an acid component dissociates from the latent acid.

2. The resin composition of claim 1, wherein the resin composition comprises about 25 wt % to about 65 wt % of the phenolic resin, about 0.01 wt % to about 10 wt % of the latent acid, about 1 wt % to about 12 wt % of the base compound, and about 32 wt % to about 70 wt % of the liquid medium, based on a combined weight of the phenolic resin, the latent acid, the base compound, and the liquid medium.

3. The resin composition of claim 1, wherein the resin composition comprises about 25 wt % to about 45 wt % of the phenolic resin, about 0.01 wt % to about 3 wt % of the latent acid, about 1 wt % to about 7 wt % of the base compound, and about 45 wt % to about 65 wt % of the liquid medium, based on a combined weight of the phenolic resin, the latent acid, the base compound, and the liquid medium.

4. The resin composition of claim 1, wherein the phenolic resin comprises a phenol formaldehyde resin having a formaldehyde to phenol molar ratio of about 1.9:1 to about 2.6:1.

5. The resin composition of claim 1, wherein the latent acid comprises the acid component and a base component, wherein the acid component comprises a phosphorous-containing acid, a sulfur-containing acid, a nitrogen-containing acid, an organic mineral acid, a halogen-containing acid, conjugate bases thereof, alkaline salts thereof, rare earth salts thereof, or a mixture thereof, and wherein the base component comprises a primary amine, a secondary amine, or a tertiary amine.

6. The resin composition of claim 1, wherein the latent acid comprises hydroxylamine sulfate, hydroxylamine phosphate, hydroxylamine phenol sulfonate, hydroxylamine p-toluene sulfonate, or any mixture thereof.

7. The resin composition of claim 1, wherein the latent acid comprises an amine salt of triethylamine and sulfuric acid.

8. The resin composition of claim 1, wherein the base compound comprises an alkali metal hydroxide, an alkali earth metal hydroxide, or a mixture thereof.

9. The resin composition of claim 1, wherein the base compound comprises ammonia, sodium hydroxide, ammonium hydroxide, potassium hydroxide, triethylenetetraamine, diethylenetriamine, triethylamine, urea, or a mixture thereof.

10. The resin composition of claim 1, wherein the resin composition comprises the base compound in an amount sufficient such that the resin composition has a pH of at least 8 when the acid component dissociates from the latent acid.

11. The resin composition of claim 1, wherein:
the phenolic resin comprises a phenol formaldehyde resin having a formaldehyde to phenol molar ratio of about 1.9:1 to about 2.6:1,
the latent acid comprises hydroxylamine sulfate, hydroxylamine phosphate, hydroxylamine phenol sulfonate, hydroxylamine p-toluene sulfonate, or any mixture thereof,
the base compound comprises ammonia, sodium hydroxide, ammonium hydroxide, potassium hydroxide, triethylenetetraamine, diethylenetriamine, triethylamine, urea, or a mixture thereof,
the liquid medium comprises water,
the resin composition has a pH of greater than 9, and
the resin composition comprises about 25 wt % to about 65 wt % of the phenolic resin, about 0.01 wt % to about 10 wt % of the latent acid, about 1 wt % to about 12 wt % of the base compound, and about 32 wt % to about 70 wt % of the liquid medium, based on a combined weight of the phenolic resin, the latent acid, the base compound, and the liquid medium.

12. The resin composition of claim 1, further comprising a metal salt, wherein there metal salt comprises sodium nitrate, aluminum sulfate, ammonium hydrogen phosphate, ammonium persulfate, ammonium chloride, ammonium chloride, magnesium chloride, zinc chloride, ammonium nitrate, ammonium sulfate, or a mixture thereof.

13. The resin composition of claim 1, further comprising a plurality of lignocellulose substrates.

14. A resin composition, comprising: about 25 wt % to about 65 wt % of a phenolic resin, about 0.01 wt % to about 10 wt % of a latent acid, about 1 wt % to about 12 wt % of a base compound, and about 32 wt % to about 70 wt % of a liquid medium, based on a combined weight of the phenolic resin, the latent acid, the base compound, and the liquid medium, wherein:
the phenolic resin comprises a phenol formaldehyde resin having a formaldehyde to phenol molar ratio of about 1.9:1 to about 2.6:1,
the latent acid comprises an amine salt of triethylamine and sulfuric acid,
the base compound comprises sodium hydroxide, potassium hydroxide, or a mixture thereof,
the liquid medium comprises water,
the resin composition has a pH of greater than 10, and
the resin composition comprises the base compound in an amount sufficient such that the resin composition has a pH of at least 7.5 when an acid component dissociates from the latent acid.

15. A method for making a composite product, comprising:
mixing a plurality of lignocellulose substrates and a resin composition to produce a resinated furnish, wherein the resin composition comprises a phenolic resin, a latent acid, a base compound, and a liquid medium; and
curing the resin composition in the resinated furnish to produce a composite product, wherein an acid component dissociates from the latent acid when the resin composition is cured, and wherein the resin composition maintains a pH of at least 7.5 when the acid component dissociates from the latent acid.

16. The method of claim 15, wherein the resin composition comprises about 25 wt % to about 65 wt % of the phenolic resin, about 0.01 wt % to about 10 wt % of the latent acid, about 1 wt % to about 12 wt % of the base compound, and about 32 wt % to about 70 wt % of the liquid medium, based on a combined weight of the phenolic resin, the latent acid, the base compound, and the liquid medium.

17. The method of claim 15, wherein the resin composition comprises about 25 wt % to about 45 wt % of the phenolic resin, about 0.01 wt % to about 3 wt % of the latent acid, about 1 wt % to about 7 wt % of the base compound, and about 45 wt % to about 65 wt % of the liquid medium, based on a combined weight of the phenolic resin, the latent acid, the base compound, and the liquid medium.

18. The method of claim 15, wherein the resinated furnish is heated to a temperature of about 100° C. to about 300° C. to at least partially cure the resin composition and produce the composite product.

19. The method of claim 15, wherein the resin composition further comprises a metal salt, wherein there metal salt comprises sodium nitrate, aluminum sulfate, ammonium hydrogen phosphate, ammonium persulfate, ammonium chloride, ammonium chloride, magnesium chloride, zinc chloride, ammonium nitrate, ammonium sulfate, or a mixture thereof.

20. The method of claim 15, wherein:
the phenolic resin comprises a phenol formaldehyde resin having a formaldehyde to phenol molar ratio of about 1.9:1 to about 2.6:1,
the latent acid comprises an amine salt of triethylamine and sulfuric acid,
the base compound comprises sodium hydroxide, potassium hydroxide, or a mixture thereof,
the liquid medium comprises water,
the resin composition has a pH of greater than 10, and
the resin composition maintains a pH of at least 8 when the acid component dissociates from the latent acid.

* * * * *